US010306505B2

(12) United States Patent
Golitschek Edler von Elbwart

(10) Patent No.: US 10,306,505 B2
(45) Date of Patent: May 28, 2019

(54) COMMUNICATION SCHEME FOR CHANNEL QUALITY INFORMATION

(71) Applicant: Optis Wireless Technology, LLC, Plano, TX (US)

(72) Inventor: Alexander Golitschek Edler von Elbwart, Darmstadt (DE)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

(21) Appl. No.: 15/877,609

(22) Filed: Jan. 23, 2018

(65) Prior Publication Data
US 2018/0160329 A1 Jun. 7, 2018

Related U.S. Application Data

(63) Continuation of application No. 15/441,295, filed on Feb. 24, 2017, now Pat. No. 9,913,161, which is a (Continued)

(30) Foreign Application Priority Data

Sep. 26, 2006 (EP) ..................................... 06020175

(51) Int. Cl.
*H04L 1/00* (2006.01)
*H04W 24/10* (2009.01)
(Continued)

(52) U.S. Cl.
CPC .......... *H04W 24/10* (2013.01); *H04B 7/0413* (2013.01); *H04L 1/0026* (2013.01);
(Continued)

(58) Field of Classification Search
CPC ............. H04W 24/10; H04W 72/0453; H04W 84/042; H04W 88/02; H04L 1/0026;
(Continued)

(56) References Cited

U.S. PATENT DOCUMENTS 7,126,996 B2 * 10/2006 Classon ................ H04L 1/0018
375/260
7,545,763 B2 6/2009 Wunder et al.
(Continued)

FOREIGN PATENT DOCUMENTS

EP 1 533 966 5/2005
EP 1 633 073 3/2006
(Continued)

OTHER PUBLICATIONS

U.S. Appl. No. 15/441,295, filed Feb. 24, 2017, Golitschek Edler von Elbwart.
(Continued)

*Primary Examiner* — Afsar M Qureshi
(74) *Attorney, Agent, or Firm* — Nixon & Vanderhye P.C.

(57) ABSTRACT

A transmitter reports channel quality information by partitioning channel quality values, based on a channel quality information reporting parameter, into at least two partitions, each partition corresponding to a frequency bandwidth associated with the communications system. A channel quality value of the channel quality values of at least one of the at least two partitions is encoded to obtain signaling information on channel quality, including at least one of first channel quality information and second channel quality information, based on the channel quality information reporting parameter, wherein the second channel quality information is different from the first channel quality information. The transmitter transmits the signaling information on the channel quality by reporting the first channel quality information or the second channel quality information at different reporting frequencies depending on the channel quality information reporting parameter.

17 Claims, 15 Drawing Sheets

Related U.S. Application Data continuation of application No. 14/992,044, filed on Jan. 11, 2016, now Pat. No. 9,591,507, which is a continuation of application No. 14/308,380, filed on Jun. 18, 2014, now Pat. No. 9,258,728, which is a continuation of application No. 13/967,134, filed on Aug. 14, 2013, now Pat. No. 8,792,834, which is a continuation of application No. 13/570,045, filed on Aug. 8, 2012, now Pat. No. 8,538,344, which is a continuation of application No. 12/442,577, filed as application No. PCT/EP2007/006977 on Aug. 7, 2007, now Pat. No. 8,265,566.

(51) Int. Cl.
*H04W 72/04* (2009.01)
*H04W 84/04* (2009.01)
*H04W 88/02* (2009.01)
*H04B 7/0413* (2017.01)

(52) U.S. Cl.
CPC .......... *H04L 1/0027* (2013.01); *H04L 1/0028* (2013.01); *H04W 72/0453* (2013.01); *H04W 84/042* (2013.01); *H04W 88/02* (2013.01)

(58) Field of Classification Search
CPC ... H04L 1/0027; H04L 1/0028; H04L 1/0042; H04L 1/0047; H04B 7/0413
See application file for complete search history.

(56) References Cited

U.S. PATENT DOCUMENTS

| | | | |
|---|---|---|---|
| 8,265,566 | B2 | 9/2012 | Golitschek |
| 8,538,344 | B2 | 9/2013 | Golitschek |
| 8,792,834 | B2 | 7/2014 | Golitschek Edler von Elbwart |
| 9,258,728 | B2 * | 2/2016 | Golitschek Edler von Elbwart ................ H04L 1/0026 |
| 9,591,507 | B2 | 3/2017 | Golitschek Edler von Elbwart |
| 2001/0033622 | A1 | 10/2001 | Jongren et al. |
| 2003/0003880 | A1 | 1/2003 | Ling et al. |
| 2004/0179493 | A1 * | 9/2004 | Khan ................ H04W 52/24 370/332 |
| 2005/0207335 | A1 | 9/2005 | Schmidl et al. |
| 2005/0281226 | A1 | 12/2005 | Lee et al. |
| 2006/0057965 | A1 * | 3/2006 | Braun ................ H04W 36/30 455/67.11 |
| 2006/0165188 | A1 | 7/2006 | Wunder et al. |
| 2007/0026810 | A1 | 2/2007 | Love et al. |
| 2007/0153731 | A1 | 7/2007 | Fine |
| 2009/0028260 | A1 | 1/2009 | Xiao |
| 2010/0309997 | A1 * | 12/2010 | Kimura ................ H04L 1/0026 375/260 |

FOREIGN PATENT DOCUMENTS

| | | |
|---|---|---|
| JP | 2005-86444 | 3/2005 |
| JP | 2006-211651 | 8/2006 |
| WO | 2006/011347 | 2/2006 |
| WO | 2006/028204 | 3/2006 |
| WO | 2006/020400 | 6/2006 |

OTHER PUBLICATIONS

Office Action dated Jun. 23, 2017 in co-pending U.S. Appl. No. 15/441,295, 12 pages.
Japanese Office Action dated Feb. 24, 2015 in JP 2014-027502 and English translation, 7 pages.
"3rd Generation Partnership Project; Technical Specification Group Radio Access Network; Physical layer aspects for evolved Universal Terrestrial Radio Access (UTRA) (Release 7)," Technical Report, 3GPP TR 25.814 V7.0.0, Jun. 2006, 126 pages.
Ericsson, "E-UTRA Incremental CQI Reporting Using DCT Coding," R1-062278, Agenda Item: 8.5, TSG-RAN WG1 #46, Tallinn, Estonia, Aug. 28-Sep. 1, 2006, 8 pages.
Extended European Search Report, dated Aug. 22, 2011, for European Application No. 10190207.0, 6 pages.
Huawei, "Overhead reduction of UL CQI signalling for E-UTRA DL," R1-061819, Agenda Item: 6.3, 3GPP TSG RAN LTE Ad Hoc, Cannes, France, Jun. 27-30, 2006, 9 pages.
International Search Report, dated Nov. 6, 2007, for International Application No. PCT/EP2007/006977, 3 pages.
Japanese Office Action dated Oct. 22, 2013, for corresponding JP Application No. 2012-114524, 5 pages.
LG Electronics, "DCT based CQI reporting scheme," R1-061777, Agenda Item: 6.3, 3GPP TSG RAN WG1 LTE Ad Hoc, Cannes, France, Jun. 27-30, 2006, 11 pages.
Mitsubishi Electric, "Comparison of CQI feedback schemes and a number of control bits," R1-061815, Agenda Item: 6.3.1, 3GPP TSG RAN WG1 LTE ad hoc, Cannes, France, Jun. 27-30, 2006, 9 pages.
Notice of Reason for Rejection, dated Mar. 27, 2012, for Japanese Application No. 2009-529547, 6 pages.
Wengerter et al., "Fairness and Throughput Analysis for Generalized Proportional Fair Frequency Scheduling in OFDMA," 61st IEEE Vehicular Technology Conference 3:1903-1907, May 30-Jun. 1, 2005, 5 pages.
European Office Action dated Sep. 30, 2016 in EP 06020175.3, 4 pages.
European Office Action dated Sep. 5, 2017 in EP 06020175.3, 5 pages.
European Office Action dated Oct. 16, 2017 in EP 10190207.0, 4 pages.
European Office Action dated Jul. 5, 2018 in EP Application No. 06020175.3, 4 pages.
Office Action dated Dec. 19, 2018 in EP Application No. 06020175.3, 4 pages.
Notice of Reasons for Rejection dated Feb. 12, 2019 in JP Application No. 2018-093011 and English Translation, 4 pages.

* cited by examiner

Fig. 10

| Bitmap | 1 | 0 | 0 | 1 | 1 | 0 | 1 | 0 | 0 | 0 | 1 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|
| DCT Coefficient Index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

Fig. 13

| Bitmap | 0 | 0 | 0 | 0 | 0 | 0 | 0 | 1 | 1 | 1 | 0 | 0 | 0 | 0 | 0 | 0 | 0 | 1 | 1 | 0 | 0 | 0 | 0 | 0 |
|---|---|---|---|---|---|---|---|---|---|---|---|---|---|---|---|---|---|---|---|---|---|---|---|---|
| Resource Unit Index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

Fig. 15

| Bitmap | 0 | 0 | 0 | 0 | 0 | 0 | 0 | 0 | 1 | 1 | 0 | 0 | 0 | 0 | 0 | 0 | 0 | 1 | 1 | 0 | 0 | 0 | 0 | 0 |
|---|---|---|---|---|---|---|---|---|---|---|---|---|---|---|---|---|---|---|---|---|---|---|---|---|
| Resource Unit Index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

COMMUNICATION SCHEME FOR CHANNEL QUALITY INFORMATION

CROSS-REFERENCE TO RELATED APPLICATIONS

This application is a continuation of U.S. application Ser. No. 15/441,295, filed Feb. 24, 2017, (now U.S. Pat. No. 9,913,161, issued on Mar. 6, 2018) which is a continuation of U.S. application Ser. No. 14/992,044, filed Jan. 11, 2016 (now U.S. Pat. No. 9,591,507), which is a continuation of U.S. application Ser. No. 14/308,380, filed Jun. 18, 2014 (now U.S. Pat. No. 9,258,728), which is a continuation of U.S. application Ser. No. 13/967,134, filed Aug. 14, 2013 (now U.S. Pat. No. 8,792,834), which is a continuation of U.S. application Ser. No. 13/570,045, filed Aug. 8, 2012 (now U.S. Pat. No. 8,538,344), which is a continuation of U.S. application Ser. No. 12/442,577, filed May 7, 2009 (now U.S. Pat. No. 8,265,566), which is the U.S. national phase of International Application No. PCT/EP2007/006977, filed Aug. 7, 2007, which designated the U.S. and claims priority to EP Application No. 06020175.3, filed Sep. 26, 2006, the entire contents of each of which are incorporated herein by reference.

FIELD OF THE INVENTION

The invention relates to a method for receiving and a method for reconstructing channel quality information in a communication system. Further, the invention also provides a transmitter and receiver performing these methods, respectively.

TECHNICAL BACKGROUND

Packet-Scheduling and Shared Channel Transmission

In wireless communication systems employing packet-scheduling, at least part of the air-interface resources are assigned dynamically to different users (mobile stations—MS). Those dynamically allocated resources are typically mapped to at least one shared data channel (SDCH). A shared data channel may for example have one of the following configurations:

One or multiple codes in a CDMA (Code Division Multiple Access) system are dynamically shared between multiple MS.

One or multiple subcarriers (subbands) in an OFDMA (Orthogonal Frequency Division Multiple Access) system are dynamically shared between multiple MS.

Combinations of the above in an OFCDMA (Orthogonal Frequency Code Division Multiplex Access) or a MC-CDMA (Multi Carrier-Code Division Multiple Access) system are dynamically shared between multiple MS.

FIG. 1 shows a resource-scheduling system on a communication channel for systems with e.g., a single shared data channel. A transmission time interval (TTI) reflects the smallest interval at which the scheduler (e.g., the Physical Layer or MAC Layer Scheduler) performs the dynamic resource allocation (DRA). In FIG. 1, a TTI equal to one subframe (also referred to as a time slot) is assumed. It should be noted that generally a TTI may also span over multiple subframes.

Further, the smallest unit of radio resources (also referred to as a resource block), that can be allocated in OFDMA systems, is typically defined by one TTI in the time domain and by one subcarrier/subband in the frequency domain. Similarly, in a CDMA system this smallest unit of radio resources is defined by a TTI in the time domain and a code in the code domain.

In OFCDMA or MC-CDMA systems, this smallest unit is defined by one TTI in time domain, by one subcarrier/subband in the frequency domain and one code in the code domain. Note that dynamic resource allocation may be performed in the time domain and in the code/frequency domain.

The main benefits of packet-scheduling are the multi-user diversity gain by time domain scheduling (TDS) and dynamic user rate adaptation (DRA).

Assuming that the channel conditions of the users change over time due to fast (and slow) fading, at a given time instant the scheduler can assign available resources (codes in case of CDMA, subcarriers/subbands in case of OFDMA) to users having good channel conditions in time domain scheduling.

Specifics of DRA and Shared Channel Transmission in OFDMA

Additionally to exploiting multi-user diversity in time domain by Time Domain Scheduling (TDS), in OFDMA multi-user diversity can also be exploited in frequency domain by Frequency Domain Scheduling (FDS). This is because the OFDM signal is constructed out of multiple narrowband subcarriers (typically grouped into subbands) in frequency domain, which can be assigned dynamically to different users. By this, the frequency selective channel properties due to multi-path propagation can be exploited to schedule users on frequencies (subcarriers/subbands) on which they have a good channel quality (multi-user diversity in frequency domain).

In an OFDMA system the bandwidth is divided into multiple subbands for practical reasons that consist out of multiple subcarriers. I.e., the smallest unit on which a user may be allocated would have a bandwidth of one subband and a duration of one subframe (which may correspond to one or multiple OFDM symbols), which is denoted as a resource block (RB). Typically a subband consists of consecutive subcarriers. However in some cases it is desired to form a subband out of distributed non-consecutive subcarriers. A scheduler may also allocate a user over multiple consecutive or non-consecutive subbands and/or subframes.

For the 3GPP Long Term Evolution (see 3GPP TR 25.814: "Physical Layer Aspects for Evolved UTRA", Release 7, v. 7.0.0, June 2006—available at http://www.3gpp.org and incorporated herein by reference), a 10 MHz system may consist of 600 subcarriers with a subcarrier spacing of 15 kHz. The 600 subcarriers may then be grouped into 24 subbands (each containing 25 subcarriers), each subband occupying a bandwidth of 375 kHz. Assuming that a subframe has a duration of 0.5 ms, a resource block (RB) would span over 375 kHz and 0.5 ms according to this example.

In order to exploit multi-user diversity and to achieve scheduling gain in frequency domain, the data for a given user should be allocated on resource blocks on which the user has a good channel condition. Typically, those resource blocks are located close to each other and, therefore, this transmission mode is also denoted as localized mode (LM). FIG. 2 shows an exemplary data transmission to users in an OFDMA system in localized mode (LM) having a distributed mapping of Layer 1/Layer 2 control signalling.

Alternatively, the users may be allocated in a distributed mode (DM). In this configuration a user (mobile station) is allocated on multiple resource blocks, which are distributed over a range of resource blocks. In distributed mode a number of different implementation options are possible. For exemplary purposes a data transmission to users in an OFDMA system in distributed mode (DM) having a distributed mapping of Layer 1/Layer 2 control signalling is shown in FIG. 3.

Link Adaptation

In mobile communication systems link adaptation is a typical measure to exploit the benefits resulting from dynamic resource allocation. One link adaptation technique is AMC (Adaptive Modulation and Coding). Here, the data-rate per data block or per scheduled user is adapted dynamically to the instantaneous channel quality of the respective allocated resource by dynamically changing the modulation and coding scheme (MCS) in response to the channel conditions. This may require a transmitter to have or obtain a channel quality estimate for the link to the respective receiver. Typically hybrid ARQ (HARQ) techniques are employed in addition. In some configurations it may also make sense to use fast/slow power control.

Channel Quality Information (CQI) Transmission

In a multi-user centrally managed system, a scheduler assigns transmission resources to several users as has been outlined above. Since generally the channel conditions for different users will vary over at least time and frequency, some sort of channel state or channel quality information is required at the scheduler, preferably transmitted from each user equipment device to the scheduler entity.

For most multi-user scheduler algorithms (except Round Robin), the most accurate channel state information should be for the strongest resource blocks, to optimally assign a resource to a user where the channel exhibits a good quality. This will further be used in case that for transmission of data, the modulation or coding scheme is adapted to the channel quality, to increase the spectral efficiency, i.e., in cases where link adaptation is performed.

Generally the CQI is transmitted from a transmitting entity to a receiver entity. In the context of 3G radio network as in UMTS, where a NodeB may act as the multi-user management entity, as well as a multi-cell management entity, the CQI for the downlink transmission chain is obtained (estimated) by a user equipment (UE), which subsequently transmits CQI to a NodeB. Therefore with respect to CQI transmission the user equipment acts as the transmitter entity, and the NodeB as the receiver entity.

Full Feedback

In case a full feedback is transmitted, i.e., the CQI information is not compressed prior to transmission, a CQI value for each of the $N_{rb}$ resource blocks is transmitted, giving the highest accuracy of information at a very high cost of required transmission bits. To get a rough estimate of the overhead on the CQI feedback information, a system based on the following configurations may be considered: the communication system is equipped with 2×2 MIMO (Multiple Input Multiple Output) using PARC (Per Antenna Rate Control), 20 MHz transmission bandwidth (48 Resource Blocks), 0.5 ms CQI feedback interval, ⅓ rate turbo encoding, no-repetitions or puncturing, and with 24 bit CRC attached. The total CQI feedback overhead of this configuration would be 2.904 Mbps per user.

CQI Compression

One approach to reduce the overhead induced by CQI signalling has been suggested in 3GPP RAN WG#1 Tdoc. R1-061777, "DCT based CQI reporting scheme", available at http://www.3gpp.org and incorporated herein by reference. The document proposes a scheme using a Discrete Cosine Transform (DCT) to concentrate information into a small number of coefficients and discusses different mechanisms which coefficients, to transmit.

Strongest-M DCT and First-M DCT

The "Strongest-M" DCT scheme transmits the DC component of the transformation and in addition M−1 most significant DCT coefficients. Assuming that M is known to transmitter and receiver, only indices of the transmitted coefficients as well as the values of the transmitted coefficients need to be signalled. If M is not known by either the transmitter or the receiver, the value of M may have to be signalled as well.

The "First-M" DCT scheme transmits the M coefficients with the M lowest index values. Assuming that M is known to transmitter and receiver, only the values of the transmitted coefficients need to be signalled. If M is not known by either the transmitter or the receiver, the value of M may have to be signalled as well.

An example of a channel snapshot and an exemplary reconstruction of the channel power using "Strongest 5" DCT scheme is shown in FIG. 8. The corresponding DCT of the complete ("Full DCT") and compressed ("Strongest 5" DCT) channel information is shown in FIG. 9. While the channel state may be reconstructed perfectly if all DCT coefficients ("Full DCT") are transmitted, the channel state reconstruction will generally be suboptimum if only a subset of the DCT coefficients is transmitted. The choice of which DCT coefficients are transmitted will affect the accuracy of the reconstructed channel state.

In the "Strongest 5" DCT scheme, only the 5 components with the largest magnitude are chosen in the compression scheme. Since the DC component may be of increased importance, and as it can usually be expected to be among the strongest components anyway, it may be preferable to always transmit the DC coefficient. A bitmap that shows which 5 of the 24 DCT components have the largest magnitude is given in FIG. 10, where a "1" value that the DCT component of that particular index belongs to one of the M largest magnitude coefficients.

It is a matter of convention whether the DCT components are labeled (numbered) from 0 to $N_{rb}-1$ or from 1 to $N_{rb}$, or similar. Either way usually the DCT component with the lowest index is commonly referred to as the "DC coefficient" or "DC component" (DC=Direct Current). Without loss of generality a numbering ranging from 1 to $N_{rb}$ is assumed in the examples described herein.

While the above mentioned approaches for transmitting the CQI information are based on performing a DCT on the channel state information and encoding the resulting coefficients, there also exist other schemes where the channel state information, i.e., the individual power levels per resource block are encoded without performing a transformation.

3GPP RAN WG#1 Tdoc. R1-061819, "Overhead reduction of UL CQI signalling for E-UTRA DL", available at http://www.3gpp.org and incorporated herein by reference, discusses a "Best-M" scheme for feedback reduction of channel quality signalling where a UE reports a label which indicates the M resource blocks with highest signal quality and additionally a single channel quality indicator for these resource blocks. Assuming that M is known to the transmitter and the receiver, signalling of the M selected indices and the selected M values is needed in a CQI report.

A further scheme referred to as "Best M Individual" scheme reports the power for each of the M best resource blocks, and average power for other resource blocks. Assuming that M is known to the transmitter and the receiver, signalling of the M selected indices, the selected M values, and the average value is needed in a CQI report. An exemplary bitmap that signals the best 5 out of 24 resource blocks is shown in FIG. 13.

A further scheme referred to as "Best M Average" reports the average power for M best resource blocks, and average power for other resource blocks. Assuming that M is known to the transmitter and the receiver, signalling of the M selected indices and the two average values is needed in a CQI report. An exemplary bitmap that signals the best 5 out of 24 resource blocks is shown in FIG. 13.

An example of a channel snapshot and an exemplary reconstruction of the channel power using a "Best 5 Individual" scheme and a "Best 5 Average" scheme are shown in FIG. 11 and in FIG. 12, respectively. As can be seen, the "Best 5 Individual" scheme manages to give exact information for the 5 strongest resource blocks (number 8, 9, 10, 18, 19), but quite substantial deviations from the correct value for all other resource blocks. The "Best 5 Average" scheme gives by chance quite accurate information for resource blocks 18 and 19, while we can identify larger deviations—both better and worse—from the correct value for resource blocks 8, 9, and 10. Likewise, for all other resource blocks the reconstructed value may exhibit large differences from the correct values.

Average CQI

Another scheme to reduce the CQI values is to determine the average CQI value and transmit this average value. This may be interpreted as a special case of a Best $M=N_{rb}$ Average or Best $M=0$ Average scheme. It requires the least amount of transmitted information, however it also offers a generally very low accuracy with respect to the reconstructed resource block-wise channel quality information.

Signalling

Obviously, there is a need for using information symbols to convey the CQI from the transmitter to the receiver. Without loss of generality, it may be assumed that bits can be used as information symbols. Using the notations defined in subsequent sections, the number of bits required for such signalling is illustrated in Table 1.

TABLE 1

| CQI Scheme | Number of required bits |
|---|---|
| Full Feedback | $D \cdot Nrb$ |
| Average | $D$ |
| Best M Individual | $D \cdot (M + 1) + \left\lceil ld\binom{N_{rb}}{M} \right\rceil$ |
| Best M Average | $2 \cdot D + \left\lceil ld\binom{N_{rb}}{M} \right\rceil$ |
| DCT Greatest M (assuming that DC coefficient is always transmitted) | $D \cdot M + \left\lceil ld\binom{N_{rb}-1}{M-1} \right\rceil$ |

As can be calculated from Table 1 and has been indicated above, the full feedback scheme requires a very high amount of bits to signal the CQI. This requirement may be too high to fulfill in a transmission system, particularly in cellular mobile radio systems where a large number of entities have to report CQI values.

Also DCT-based schemes do not offer an optimal solution for transmitting the CQI information. Since only a limited number of coefficients is transmitted in a DCT compression scheme, the reconstruction at the receiver (which typically offers scheduling functions) is generally not optimum for any resource block. Consequently there will be deviations for the strongest resource blocks, which will result in erroneous scheduler decisions or suboptimum adaptive modulation and coding decisions by the link adaptation entity. Consequently the spectral efficiency is reduced.

In the "Best M Individual" scheme, very detailed information on the channel state is transmitted for the strongest M resource blocks. For all other resource blocks, the information available at the scheduler is extremely rudimentary. Particularly in case that M is rather small, a problem occurs if a user is assigned more resource blocks than M resource blocks. In this case, some allocated resources are only allocated according to an average resource block quality, which certainly is suboptimum. Furthermore, a subsequent link adaptation would also be based on such an average value, resulting in suboptimum link adaptation and consequently in reduced spectral efficiency. This problem may be circumvented by a high number M, however at the drawback that a lot of feedback signalling is required in this case. Therefore another potential problem is to suggest a coding scheme that requires a small amount of feedback signalling.

In the "Best M Average" scheme, the problems are two-fold. On the one hand, a small number of M will result in similar problems as a small M in the "Best M Individual" scheme. Additionally, the accuracy of the best M resource blocks reported is not as high as in the "Best M Individual" scheme, further deteriorating the accuracy of scheduling or link adaptation performance.

On the other hand, a simple increase of M is not guaranteed to improve the behavior of the "Best M Average" scheme. Even though the number of resource blocks which are contained within the signalled set increases, the averaging over those M resources will decrease the accuracy for those resource blocks. Therefore there is an optimum M for which the number and level of detail provide the most accurate allocation or link adaptation.

In any case, finding this value of M may not be trivial in a mobile or cellular environment, and—in addition—even when having found an appropriate M value, the achievable data transmission throughput in data transmission is generally bad because of the averaging feature of this scheme.

It should be obvious to those skilled in the art that the information conveyed by the average CQI scheme is of very low accuracy. In order to perform meaningful resource scheduling or link adaptation using CQI-dependant modulation or coding schemes, a higher accuracy than that provided by the average scheme has to be available.

SUMMARY OF THE INVENTION

One object of the invention is to suggest a scheme for transmitting channel quality measures from a transmitter to a receiver that may mitigate at least one of the problems outlined above.

Another object of the invention is to suggest a scheme for communicating channel quality measures that on the one hand allows for an accurate reconstruction of the channel quality measures at the receiver and on the other hand requires an acceptable transmission overhead.

At least one of these objects is solved by the subject matter of the independent claims. Advantageous embodiments of the invention are subject matters of the dependent claims.

According to one aspect of the invention, channel quality feedback measures for a channel (e.g., per resource unit of the channel) are divided into distinct partitions. Each partition consists only of a subset of the channel quality feedback measures. The partitioning of the channel quality feedback measures may allow for reducing the amount of overhead that needs to be attributed to the signalling of channel quality information, as (in some embodiments) the partitioning may be advantageously used to further reduce the amount of signalling information. Further, the partitioning may allow for a more accurate reconstruction of the channel state at the receiver, from which scheduling and link adaptation may benefit.

Another aspect of the invention relates to the receiver that "inverts" the encoding (compression) scheme to reconstruct the channel quality measures. In some exemplary embodiments of the invention, a scheduler may utilize the information on the channel condition to schedule air interface resources of transmitters that are served by the scheduler. Moreover, alternatively or in addition thereto, the reconstructed channel estimate may also be employed to determine the link adaptation to be applied to data transmissions on a wireless channel.

A further aspect of the invention is the use of some (re)ordering scheme that is reordering the channel quality measures prior to their transmission as channel quality information. According to this aspect the channel quality measures of a channel may be (re)ordered so that encoding of the measures yields the most accurate reconstruction of the measures at the receiver. The (re)ordering mechanism may also be combined with the other aspects of the invention outlined above.

According to one exemplary embodiment of the invention a method for transmitting channel quality information in a communication system is provided. In this method the channel quality values (e.g., of the plurality of resource units) may be first partitioned into at least two partitions. Then the channel quality values of at least one of the at least two partitions may be transformed to obtain channel quality coefficients. These coefficients may be encoded to obtain signalling information on the channel quality which is signalled to a receiving entity.

In one embodiment, the number of the channel quality coefficients obtained for a respective partition by transformation is equal to the number of the channel quality values of the respective partition.

Further, the transformation used for transforming of the channel quality values may for example be a discrete cosine transformation (DCT), a Fourier transformation or a transformation based on a continuous function.

Another embodiment of the invention relates to situations where the channel quality values are encoded. Channel quality information may be transmitted in a communication system by first partitioning channel quality values of the plurality of resource units into at least two partitions, encoding the channel quality values to obtain signalling information on the channel quality and signalling the signalling information on the channel quality to a receiving entity.

In one embodiment, the channel quality values may be partitioned by comparing the individual channel quality values to at least one channel quality threshold value. Typically, one threshold value per boundary of neighboring partitions may be defined.

Further, in another embodiment the channel quality values are partitioned by allocating a given number of channel quality values to a respective partition. This number of channel quality values in a partition may for example be preconfigured. The predefinition of the number of values per partition may for example be advantageous in that no signalling of the number of elements in the partition is necessary.

Typically, it may also be advantageous if the sum of the cardinality of the at least two partitions is equal to the number of channel quality values, i.e., all channel quality values are allocated to either one of the at least two partitions.

In a further embodiment of the invention, the channel quality coefficients or values may be encoded by compressing the channel quality coefficients or values, respectively, of at least one partition.

In one embodiment, the signalling information on the channel quality may indicate a number of encoded channel quality coefficients or values to the receiving entity that is smaller than the number of the channel quality coefficients or values, respectively, in the at least two partitions. Thereby, according to an exemplary variation of this embodiment, the channel quality coefficients or values are encoded by selecting the minimum number of channel quality coefficients or values, respectively, from a partition yielding a power level equal to or higher than a threshold power level.

According to another embodiment of the invention, the channel quality coefficients or values may be encoded by selecting a subset of the channel quality coefficients or values, respectively, from at least two partitions. Thereby, according to an exemplary variation of the embodiment, the cardinality of a first subset of the subsets may depend on the cardinality of a second subset of the subsets.

In another embodiment of the invention, it is suggested that prior to encoding at least one combined channel quality coefficient or value derived from at least two channel quality coefficients or values, respectively, is determined and that the at least one combined channel quality coefficient or value is encoded. This may for example be useful in order to reduce the signalling overhead by combining all or a subset of channel quality values/coefficients to one or more averaged values/coefficients prior to transmission.

Another option to encode the channel quality values or coefficients according to another embodiment of the invention is to encode same by selecting a predefined number of channel quality coefficients or values, respectively, from the at least two partitions. Thereby, the number of selected channel quality coefficients or values from a first partition of the at least two partitions may for example depend on at least one predetermined constraint, while the remaining number of selected channel quality coefficients or values may be selected from at least the second partition of the at least two partitions.

Generally, the partitions may be encoded according to the same or according to different encoding schemes.

Moreover, in another embodiment of the invention, the channel quality coefficients or values of at least two partitions may be jointly encoded. This may for example be implemented as follows. A respective channel quality coefficient or value in a respective partition may be identified by an index. The channel quality coefficients or values may be jointly encoded by selecting channel quality coefficients or values, respectively, from at least two partitions having the same indices.

If the at least two partitions do not have equal cardinality, it may be beneficial to add padding coefficients or values to a partition so as to obtain at least two partitions having same cardinality.

In another embodiment, a respective channel quality coefficient or value in a respective partition may be indexed.

In this embodiment averaged channel quality coefficients or values are determined prior to encoding and the averaged channel quality coefficients or values are encoded.

For example, the averaged channel quality coefficients or values may be determined by a coefficient-wise or value-wise averaging of channel quality coefficients or values, respectively from at least two partitions. Further, it may be foreseen that channel quality coefficients or values, respectively from at least two partitions having the same index are averaged coefficient-wise or value-wise, respectively. This may for example allow for reducing the index signalling overhead.

In another embodiment of the invention, the channel quality coefficients or values of at least one partition may be reordered prior to their encoding. For example, reordering is performed according to one of predefined reordering maps or according to one of predefined interleaving schemes.

As indicated previously, a respective channel quality coefficient or value in a respective partition may be identified by an index. In a further embodiment of the invention the signalling information on the channel quality may indicate the indices of the encoded channel quality coefficients or values of a respective partition included in the signalling information on the channel quality. In a variation of this embodiment, the signalling information on the channel quality may further comprise information on the values of the encoded channel quality coefficients or values.

According to another embodiment of the invention, at least one of the at least two partitions may be partitioned prior to transformation or encoding to obtain at least two sub-partitions. This may be useful in situations where for example a first partitioning is performed according to the number of antennas (e.g., one partition of channel quality values per antenna) and then each of the partitions is again divided into sub-partitions (e.g., based on a threshold value). Further, the channel quality values in at least one sub-partition may by transformed prior to encoding to obtain channel quality coefficients for a respective sub-partition.

Another embodiment of the invention relates to a method for reconstructing channel quality values. According to this method a receiving entity may receive signalling information on the channel quality from a transmitting entity. This signalling information on the channel quality may be decoded by the receiving entity to obtain channel quality coefficients of at least two partitions. Further, the channel quality coefficients of each partition may be transformed to obtain channel quality values for a respective partition, and the channel quality values may be reconstructed using the channel quality values of at least one partition.

According to another embodiment, no (inverse) transformation of channel quality coefficients may be necessary, e.g., due to performing no transformation on the transmitting entity side. In these cases the channel quality values may be directly derived from the signalling information on the channel.

In a further embodiment, the channel quality values of the plurality of resource units may be received from a plurality of transmitting entities. According to this embodiment, the receiver schedules a respective one (at least one) of the plurality of transmitting entities taking into account at least the reconstructed channel quality values signalled by the respective transmitting entity.

In another embodiment, the receiver may select at least one link adaptation parameter for link adaptation for a respective one of the plurality of transmitting entities taking into account at least the reconstructed channel quality values signalled by the respective transmitting entity. For example, this at least one link adaptation parameter may be related to at least one of a modulation and coding scheme, a configuration of at least one hybrid automatic repeat request process, and transmission power control.

Further, according to another embodiment, a management entity may determine at least one parameter for at least one of partitioning, encoding, or transformation. Moreover, the management entity may convey the at least one parameter to the channel quality information transmitter using a control signal. For example, the management entity may be a base station (Node B in the UMTS terminology) or may be another network entity located in the core network or access network of a communication system.

Another embodiment of the invention provides a transmitter for transmitting channel quality information in a communication system. This transmitter may comprise a processing unit for partitioning channel quality values into at least two partitions. The processing may further transform the channel quality values of at least one of the at least two partitions to obtain channel quality coefficients. The transmitter may also include a coding unit for encoding the channel quality coefficients to obtain signalling information on the channel quality and a transmitting unit for signalling the signalling information on the channel quality to a receiving entity.

A further embodiment of the invention relates to a transmitter comprising a processing unit for partitioning channel quality values of the plurality of resource units into at least two partitions, and a coding unit for encoding the channel quality values to obtain signalling information on the channel quality. Further, the transmitter may comprise a transmitting unit for signalling the signalling information on the channel quality to a receiving entity.

Furthermore, in another embodiment the transmitter may have means to perform the steps of the method for transmitting channel quality information in a communication system according to one of the various embodiments described herein.

According to another embodiment, a receiver for reconstructing channel quality values is provided. The receiver may comprise a receiving unit for receiving signalling information on the channel quality from a transmitting entity. Further, the receiver may have a decoding unit for decoding the signalling information on the channel quality to obtain channel quality coefficients of at least two partitions, and a processing unit for transforming the channel quality coefficients of each partition to obtain channel quality values for a respective partition. The processing unit may reconstruct the channel quality values using the channel quality values of at least one partition.

In another embodiment, a receiver for reconstructing channel quality values may comprise a receiving unit for receiving signalling information on the channel quality from a transmitting entity, and a decoding unit for decoding the signalling information on the channel quality to obtain channel quality values of at least two partitions. Moreover, the receiver according to this embodiment may comprise a processing unit for reconstructing the channel quality values of a plurality of resource units using the channel quality values of at least one partition.

Furthermore, in another embodiment the receiver may contain means to perform the steps of the method for reconstructing channel quality values according to one of the various embodiments described herein.

Another embodiment of the invention relates to a computer-readable medium storing instructions that, when executed by processor of a transmitter, cause the transmitter to transmit channel quality information in a communication system. The transmitter may be caused to transmit channel quality information in a communication system by partitioning channel quality values into at least two partitions, transforming the channel quality values of at least one of the at least two partitions to obtain channel quality coefficients, encoding the channel quality coefficients to obtain signalling information on the channel quality and signalling the signalling information on the channel quality to a receiving entity.

In another embodiment, a transmitter may be caused to transmit channel quality information in a communication system by partitioning channel quality values into at least two partitions, encoding the channel quality values to obtain signalling information on the channel quality and signalling the signalling information on the channel quality to a receiving entity.

A further embodiment relates to a computer-readable medium storing instruction that, when executed by the processor of the transmitter cause the transmitter to perform the steps of the method for transmitting channel quality values according to one of the various embodiments described herein.

Another computer-readable medium according to an embodiment of the invention stores instruction that, when executed by a processor of a receiver, cause the receiver to reconstruct channel quality values.

The receiver may be caused to reconstruct channel quality values by receiving signalling information on the channel quality from a transmitting entity, decoding the signalling information on the channel quality to obtain channel quality coefficients of at least two partitions, and transforming the channel quality coefficients of each partition to obtain channel quality values for a respective partition, and reconstructing the channel quality values of the plurality of resource units using the channel quality values of at least one partition.

In another embodiment, the receiver may be caused to reconstruct channel quality values by receiving signalling information on the channel quality from a transmitting entity, decoding the signalling information on the channel quality to obtain channel quality values of at least two partitions, and reconstructing the channel quality values of the plurality of resource units by using the channel quality values of at least one partition.

A further embodiment relates to a computer-readable medium storing instruction that, when executed by the processor of the receiver cause the receiver to perform the steps of the method for receiving channel quality information in a communication system according to one of the various embodiments described herein.

Another embodiment of the invention relates to a method for transmitting channel quality information in a communication system. The transmitting entity may reorder channel quality values, and may then transform the reordered channel quality values to obtain channel quality coefficients. Further, the channel quality coefficients may be encoded to obtain signalling information on the channel quality which may be signalled to a receiving entity.

In a further embodiment, the reordering comprises determining a number of sequences of reordered channel quality values by employing different reordering mappings. Moreover, the transmitting entity may choose a reordering mapping for which the reordered channel quality values fulfill an optimality criterion prior or after transformation.

Furthermore, in another embodiment of the invention, the reordering scheme is signalled to the receiving entity, for example, within the channel quality information.

In another embodiment, the reordering mappings are defined by at least one reordering parameter.

A further embodiment of the invention relates to a method for reconstructing channel quality values. A receiving entity may first receive signalling information on the channel quality from a transmitting entity and may decode the signalling information on the channel quality to obtain channel quality coefficients. The receiving entity may transform the channel quality coefficients, and reconstruct channel quality values by reordering the transformed channel quality coefficients.

Thereby, another embodiment foresees that the transformed channel quality coefficients are reordered according to a mapping scheme. The mapping scheme may, for example, be indicated within the channel quality information or in control signalling received by the receiving entity.

Another embodiment of the invention relates to a transmitter for transmitting channel quality information in a communication system. The transmitter comprises a reordering unit for reordering channel quality values, and a processing unit for transforming the reordered channel quality values to obtain channel quality coefficients. Further, a coding unit of the transmitter may encode the channel quality coefficients to obtain signalling information on the channel quality and a transmission unit may signal the signalling information on the channel quality to a receiving entity.

Another embodiment relates to a receiver for reconstructing channel quality values. The receiver may include a receiving unit for receiving signalling information on the channel quality from a transmitter, and further a decoding unit for decoding the signalling information on the channel quality to obtain channel quality coefficients. The receiver may also comprise a processing unit for transforming the channel quality coefficients, and a reordering unit for reconstructing channel quality values by reordering the transformed channel quality coefficients.

Another embodiment of the invention relates to a computer readable medium storing instruction that, when executed by a processor of a transmitter, cause the transmitter to transmit channel quality information in a communication system, by reordering channel quality values, transforming the reordered channel quality values to obtain channel quality coefficients, encoding the channel quality coefficients to obtain signalling information on the channel quality and signalling the signalling information on the channel quality to a receiving entity.

A further embodiment of the invention relates to a computer readable medium storing instruction that, when executed by a processor of a receiver, cause the receiver to transmit channel quality information in a communication system, by receiving signalling information on the channel quality from a transmitter, decoding the signalling information on the channel quality to obtain channel quality coefficients, transforming the channel quality coefficients, and reconstructing channel quality values by reordering the transformed channel quality coefficients

BRIEF DESCRIPTION OF THE FIGURES

In the following the invention is described in more detail in reference to the attached figures and drawings. Similar or corresponding details in the figures are marked with the same reference numerals.

FIG. 10 shows a bitmap to indicate which DCT coefficients are the strongest according to FIG. 9, FIG. 13 shows a bitmap to indicate which resource blocks have the best (strongest) channel quality values in FIG. 11 and FIG. 12, FIG. 15 shows an exemplary bitmap for signalling the affiliation of resource units to partition for FIG. 14 according to an exemplary embodiment of the invention, where a "1" denotes affiliation to a first partition and a "0" denotes affiliation to a second partition.

DETAILED DESCRIPTION OF THE INVENTION

Figure 1:
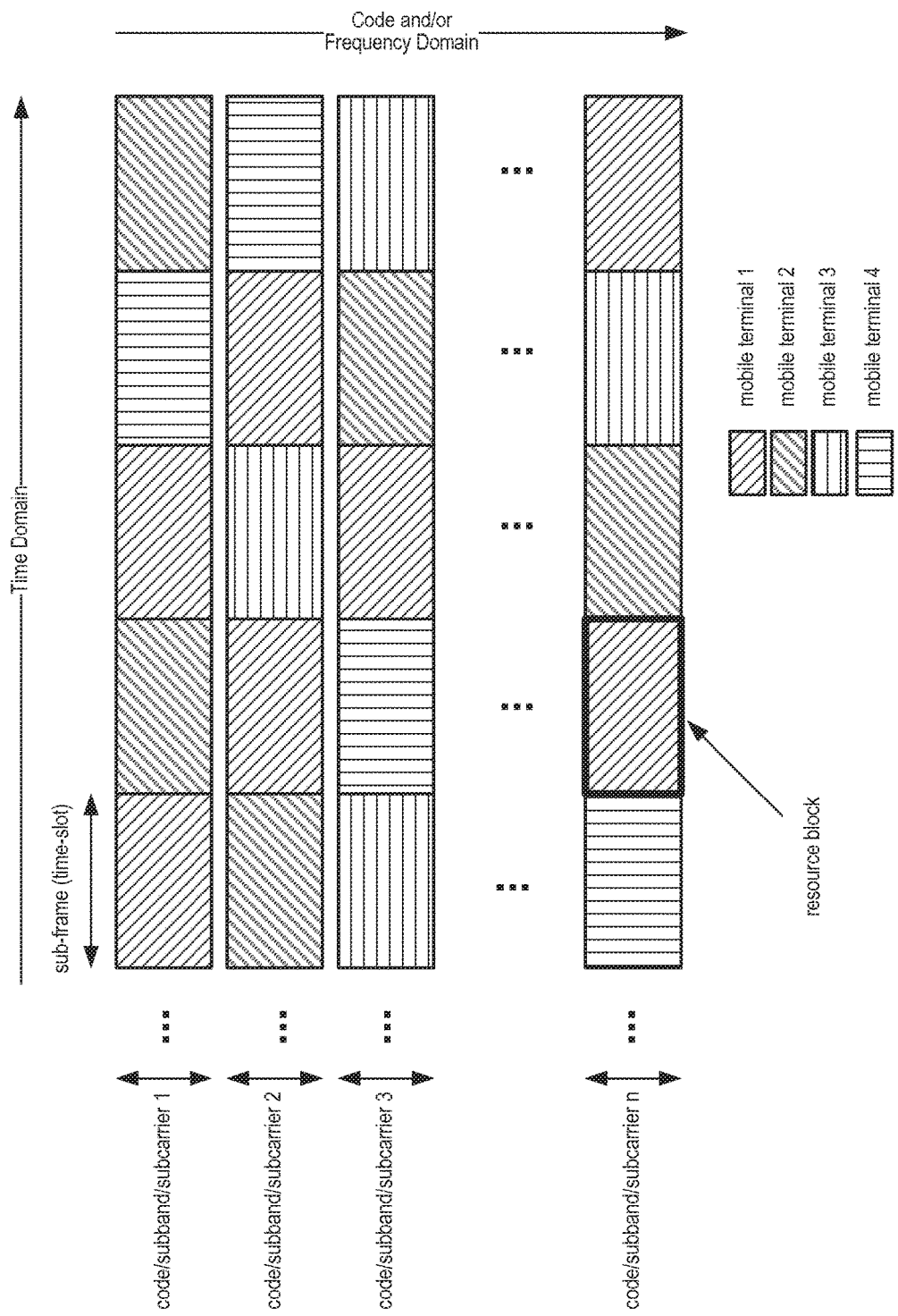
FIG. 1 shows an exemplary channel structure of an OFDMA system and a dynamic allocation of radio resources on a transmission time interval basis to different users.

Before outlining the concepts and the ideas of the invention according to different embodiments in further detail, the following notation used herein should be recognized:

$N_{rb}$ denotes the total number of resource unit of a channel,
$v_i$ or $v_i^j$ denotes a channel quality value i for resource unit i, where i=1, K, $N_{RB}$, j may indicate the partition $P_j$ to which the channel quality value has been assigned $N_{P_i}$ denotes the number of channel quality values in partition $P_i$ $$P_i = \{v_1^i, K, v_{N_{P_i}}^i\}$$

denotes a set or partition having $N_{P_i}$ channel quality values $c_i$ or $c_i^j$ denotes a channel quality coefficient i, j may indicate the transformed partition $T_j$ of the channel quality coefficient $N_{T_i}$ denotes the number of channel quality coefficients in a set or transformed partition $T_i$ $$T_i = \{c_1^i, K, c_{N_{T_i}}^i\}$$

denotes a set or transformed partition having $N_{T_i}$ channel quality coefficients obtained by transforming partition $P_i$ $N_r$ denoted the total number of defined (re)ordering algorithms $N_{MIMO}$ denotes the total number of MIMO data streams $M_o$ denotes the number of channel quality values or coefficients transmitted for all partitions $M_i$ denotes the number of transmitted channel quality values for partition Pi or the number of transmitted channel quality coefficients for transformed partition $T_i$ $M_s$ denotes the sum of transmitted (e.g., after compression) coefficients for all partitions $A_i$ denotes parent partition A $B_{i,j}$ denotes sub-partition j belonging to parent partition $A_i$ D denotes the number of bits used for transmission of a single channel quality value $v_i$ or channel quality coefficient $c_i$ $$\binom{n}{k} \text{ means } \frac{n!}{k! \cdot (n-k)!}$$

$\lceil x \rceil$ is the smallest integer number that is equal to or greater than x $Id(x) = \log_2(x)$ denotes the logarithm of x having base 2

Generally it should be further noted that the term "compression" as used herein refers to a channel quality information provision scheme, where the total channel quality information feedback overhead is reduced compared to the "Full Feedback" case described in the Technical Background section.

Further, it should be noted that the term "resource unit" as used herein refers to one of a plurality of resource units of a channel for which a channel quality measure is obtained. Channel quality reporting may thus be performed on a per-resource unit basis. Moreover, this resource unit may or may not be equal to a resource block denoting the smallest amount of resources of a channel that can be allocated to a user (e.g., by scheduling). For example in an OFDMA system, a resource unit could refer to a resource of one subframe in the time domain and a subband in the frequency domain, while a resource block denotes a subframe in the time domain and a subcarrier (of one of the subbands) in the frequency domain. In another embodiment of the invention, a resource unit refers to a range of time or frequencies (sub carriers)—in time or frequency domain—over which the channel state is substantially flat, e.g., a coherence time or coherence bandwidth, which may or may not be a multiple of the respective smallest amount of resources in the communication system (e.g., resource block, subframe, TTI).

As can be already recognized from this summary of the variables and symbols as used herein, most of the embodiments outlined herein consider for exemplary purposes the transmission of channel quality information for a channel (e.g., shared channel) in communication systems. Hence, some of the exemplary embodiments described in the sequel assume a mobile communication system as described in the Technical Background section above.

The invention relates to the communication of information on the state of a channel between a transmitting entity and a receiving entity, such as for example a mobile station and a base station in a mobile communication system. A resource management entity preferably has some sort of channel state information available for the link between base station and mobile station ("downlink") as well as for the link between mobile station and base station ("uplink"). Assuming that this resource management entity is located within the base station or farther towards the network side, the channel state information for the downlink may have to be measured by the mobile station and then be transmitted via the uplink to the base station to the resource management entity. Conversely, if said resource management entity is located within the mobile station or farther at the user equipment side, the channel state information for the uplink may have to be measured by the base station and then be transmitted via the downlink to the mobile station to the resource management entity. In some embodiments the channel state measures (or channel quality values) are provided or measured for each resource unit into which the communication channel between transmitting entity and receiving entity is divided.

One aspect of the invention is to divide the channel state measures into distinct partitions—in case of having a channel quality measure per resource unit this can also be viewed as a partitioning of the resource units. Each partition consists only of a subset of the channel state measures. The partitioning of the channel quality feedback measures may allow for reducing the amount of overhead that needs to be attributed to the signalling of channel quality information, as (in some embodiments) the portioning may be advantageously used to further reduce the amount of signalling information. Further, the partitioning of the channel quality measures may allow for a more accurate reconstruction of the channel state at the receiver.

Another aspect of the invention relates to the receiver that inverts the compression scheme to reconstruct the channel quality measures. In some exemplary embodiments of the invention, a scheduler may utilize the information on the channel condition to schedule air interface resources of transmitters that are served by the scheduler. Moreover, alternatively or in addition thereto, the reconstructed channel estimate may also be employed to determine the link adaptation to be applied to data transmissions on a wireless channel.

A further aspect of the invention is the use of some sort of (re)ordering scheme that is reordering the channel quality measures prior to their transmission as channel quality information. For example, the reordering of the channel quality measures may be obtained by an interleaving algorithm. According to this aspect the channel quality measures of a channel may be (re)ordered so that encoding of the measures yields the most accurate reconstruction of the measures at the receiver. For example, if transforming the channel quality measures and transmitting a subset of the resulting channel quality coefficients, the (re)ordering prior to the transformation may be chosen so as to concentrate most power of the channel quality measures in a number of coefficients that can be transmitted according to the encoding scheme. The (re)ordering mechanism may be combined with the other aspects of the invention as will be outlined in further detail in the following.

It may be advantageous but not a prerequisite that in multi-user communication systems the channel quality feedback is most accurate for the strongest resources. The channel quality may be periodically measured or determined by a reporting terminal. Generally, this may, for example, be implemented by measuring the channel quality for each of a plurality of resource units into which the communication channel to report on is (logically) divided at the reporting terminal to obtain a set of channel quality values or measures (e.g., power values).

Figure 4:
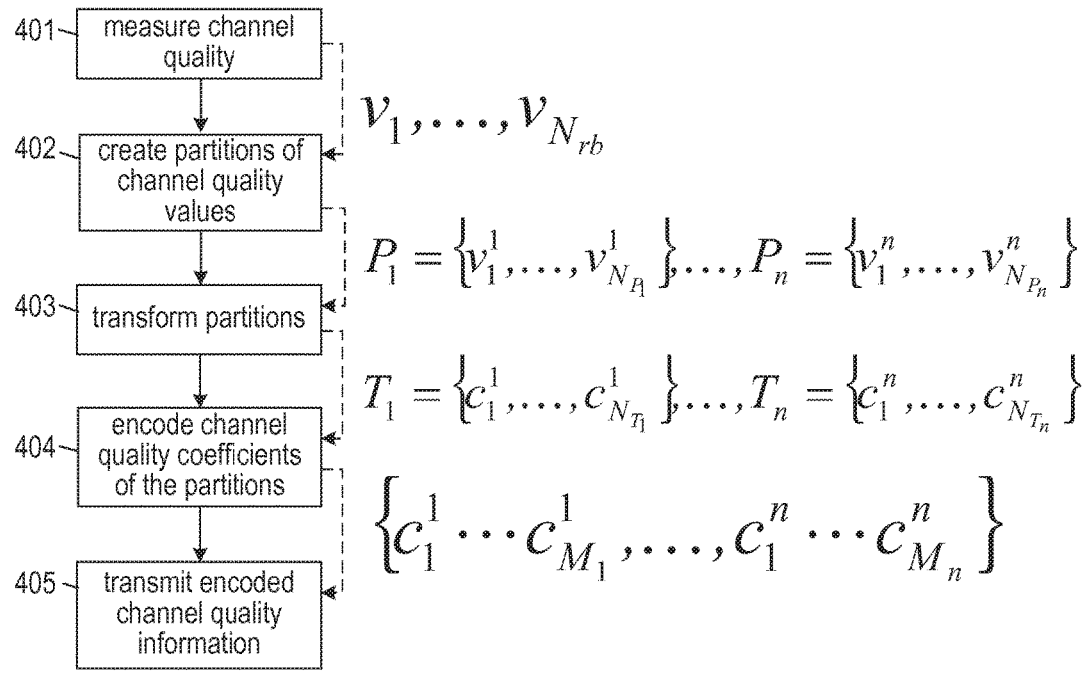
FIG. 4 shows a flow chart of a method for transmitting channel quality information according to an embodiment of the invention.
Figure 14:
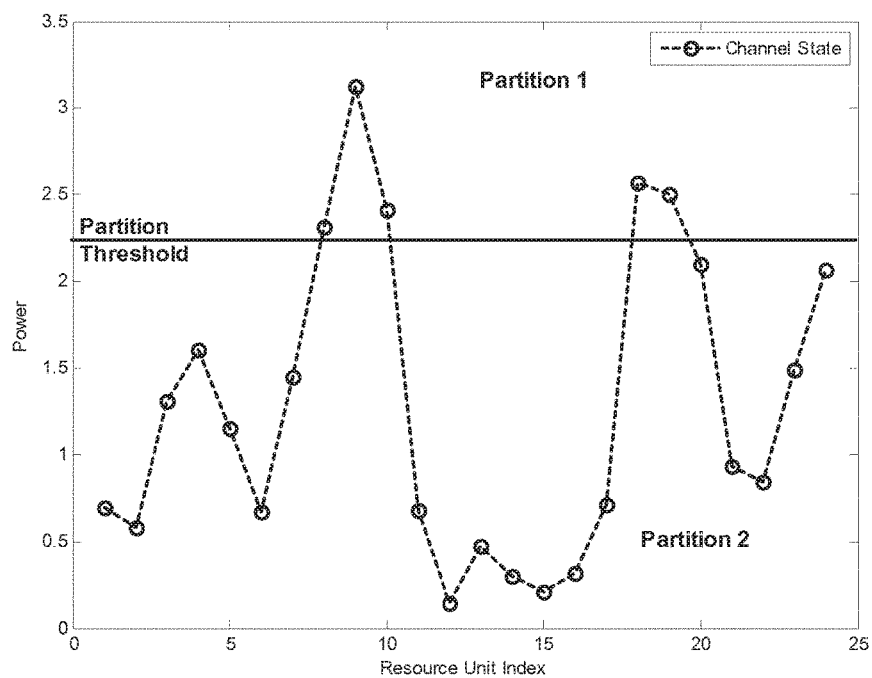
FIG. 14 shows an exemplary categorization of channel quality measures (here "power") of a plurality of resource units of a channel into two partitions according to an exemplary embodiment of the invention.

FIG. 4 shows a flow chart of a method for transmitting channel quality information according to an embodiment of the invention. In a first step the transmitting entity may determine 401 the channel quality measures of the channel. This may, for example, be accomplished by measuring a channel quality value for each resource unit of the channel on which the transmitting entity is reporting. An exemplary channel snapshot obtained by the measurement is shown in FIG. 14. For exemplary purposes only it is assumed that the channel on which is to be reported is divided into 24 resource units for which individual channel quality measures are determined. As a result of this channel quality determination procedure 24 channel quality values $v_1, K, v_{24}$ are obtained.

Next, an unequal accuracy approach by creating 402 at least two partitions of resource units is used. Each resource unit i.e., its channel quality measure may be assigned unambiguously to exactly one partition. The partitions may, for example, be defined such that resource units with similar channel quality measures (e.g., power values) are contained in the same partition.

In one exemplary embodiment, only the resource units having the strongest channel quality values (e.g., power values) are contained in a first partition, and other resource units are contained within a second partition. In the example of FIG. 14, the following partitions are created:

$$P_1 = \{v_8^1, v_9^1, v_{10}^1, v_{18}^1, v_{19}^1\} \text{ and}$$

$$P_2 = \{v_1^2, K, v_7^2, v_{11}^2, K, v_{17}^2, v_{20}^2, K, v_{24}^2\}$$

In this example, the partition creation is depending on e.g., one or more partition threshold values. FIG. 14 shows an example of the partition threshold to define a first and a second partition, each of which contains only resource units whose SINR is either above or below the threshold value, respectively. It is a matter of convention whether resource units that have SINR values equal to the threshold should go into the first or into the second partition.

Typically the partitions are each of cardinality smaller than that of the original sequence. Without loss of generality, it may be assumed that the number of elements in the first partition $N_1$ is smaller than or equal to the number of resource units in the original sequence $N_{rb}$.

Preferably, the channel quality values of the resource units are ordered in the same way as is the original sequence. Therefore following the example of FIG. 14, the first partition $P_1$ should consist of the channel quality values with the indices 8, 9, 10, 18, 19 (i.e., $v_8^1, v_9^1, v_{10}^1, v_{18}^1, v_{19}^1$) of the original sequence in that order, while the second partition should consist of the channel quality values with the indices 1-7, 11-17, 20-24 of the original sequence (i.e., $v_1^2, K, v_7^2, v_{11}^2, K, v_{17}^2, v_{20}^2, K, v_{24}^2$) in that order. Therefore the cardinality of the first partition is five ($N_1=5$), and the cardinality of the second sequence is nineteen ($N_2=19$). The sum is therefore the cardinality of the original sequence, twenty-four in this case ($N_1+N_2=N_{rb}=24$).

Evidently, when partitioning the channel quality values $v_1, K, v_{24}$ according to this example, the sum of the number of elements in each partition is equal to the number of resource units in the original sequence. The partitioning (partition affiliation) of the channel quality measures may be represented by a bitmap as illustrated in FIG. 15, where the partition to which a respective channel quality measure is assigned is indicated by a single bit. Obviously, more bits per channel quality measure are needed if more than two partitions are formed (e.g., $\lceil ld(n) \rceil$ bits for n partitions).

This example is also shown in FIG. 14 where a partition threshold is used to divide the 24 channel quality measures into two partitions. As will become more apparent from the following description, there exist multiple schemes how to partition the channel quality measures into at least two partitions. For example, in another embodiment, the number of elements that should go into each partition is known before the partition creation process. This will obviate the necessity to inform the receiver of the number of elements that belong to a partition.

In a next step 403, the channel quality values in at least one of the two created partitions are transformed. For example, according to one embodiment of the invention, a discrete cosine transform for each partition ($P_1$ and $P_2$) is performed. Details on a DCT as may be used by in an embodiment of the invention may be found in Ahmed, N., Natarajan T. and Rao K. R., "Discrete Cosine Transform", IEEE Trans. Computers, January 1974 incorporated herein by reference.

As a result the transformed partitions $T_1$ and $T_2$ are obtained. Typically, the DCT does not change the number of elements in a set, i.e., the cardinality of the transform is equal to the cardinality of the source. Consequently in the example of FIG. 14, FIG. 16 and FIG. 17, the DCT of the first partition $T_1$ contains five elements, while the DCT of the second partition $T_2$ contains nineteen elements, as visualized in FIG. 16 and FIG. 17. Nevertheless, it should be noted that it is not necessary to always calculate a number of coefficients equal to the number of elements contained in the set to be transformed. In some embodiments, fewer coefficients than elements in the set to be transformed are calculated. This may, for example, be useful in an encoding scheme where only the first M coefficients of a transformation are transmitted.

In step 404, the channel quality coefficients obtained by the transformation in step 403 are encoded. In one exemplary embodiment of the invention, this may be accomplished by performing a compression of the coefficients for each transformed partition $T_i$ separately.

For example, in each transformed partition only certain DCT coefficients are selected for feedback transmission. Generally, the number of DCT coefficients selected for transmission $M_i$ is dependent on the partition number i. In the example shown in FIG. 16 and FIG. 17, these numbers have been chosen as $M_1=M_2=3$.

Alternatively, compression may take the coefficients of at least two transformed partitions into account. In this example, the total number of DCT coefficients to be transmitted after compression (e.g., the sum $M_1+M_2$ for two partitions) is a (pre)determined or preconfigured value.

Alternatively, compression may take the number of available bits for channel quality information transmission of at least two transformed partitions into account. In this example, the total number of available bits for the channel quality information transmission compression after compression is a (pre)determined or preconfigured value. The number of transmitted DCT coefficients after compression per partition may then be determined taking the required signalling for at least two partitions into account, plus the necessary amount of bits for partition affiliation or coefficient index signalling, if required. A similar approach may also be used when "directly" compressing the channel quality values, i.e., when not performing a transformation of the partition(s).

The mobile terminal may determine how many DCT coefficients from each transformed partition are selected for transmission and under which constraint(s) the selection is performed. If, for example, the values within a transformed partition are constant or nearly constant, then one or two DCT coefficients are sufficient for reconstruction at the receiver. Consequently the mobile station may transmit more DCT coefficients of another partition that shows greater fluctuations in its DCT coefficients.

Since the transmitter, e.g., the mobile station, has the most accurate channel information, it may deliberate within the above constraints, depending on the actual channel conditions, how to use the available number of coefficients or bits to convey the optimum accuracy to the receiving entity. The constraints could be further defined to require a minimum number of coefficients for a given partition, limiting the degree of freedom of the mobile terminal. This method may however require additional signalling of the selected coefficients from the mobile station to the receiving entity.

In one embodiment of the invention, the coefficients are chosen according to their absolute values or according to their squared absolute value. In another embodiment, the coefficients are chosen such that in each partition the selected coefficients contain at least a threshold amount of power of the whole partition. In an example, since the first (transformed) partition $T_1$ may be more important than the second (transformed) partition $T_2$, it may be beneficial to select as many coefficients from the first partition $T_1$ so that the selected coefficients contain more than a partition threshold value of $P_{threshold}$ e.g., more than $P_{threshold}$=99%, of the total power contained in the first partition $T_1$. If more coefficients are required for this criterion than available in the first partition $T_1$, the strongest coefficients of partition $T_1$ should be selected. If fewer coefficients than available are required for this criterion, then the remaining coefficients may be employed to select an appropriate number of coefficients from the second partition $T_2$. Obviously, other constraints like those mentioned above (e.g., minimum number of selected coefficients per partition) may further reduce the degree of freedom.

Figure 16:
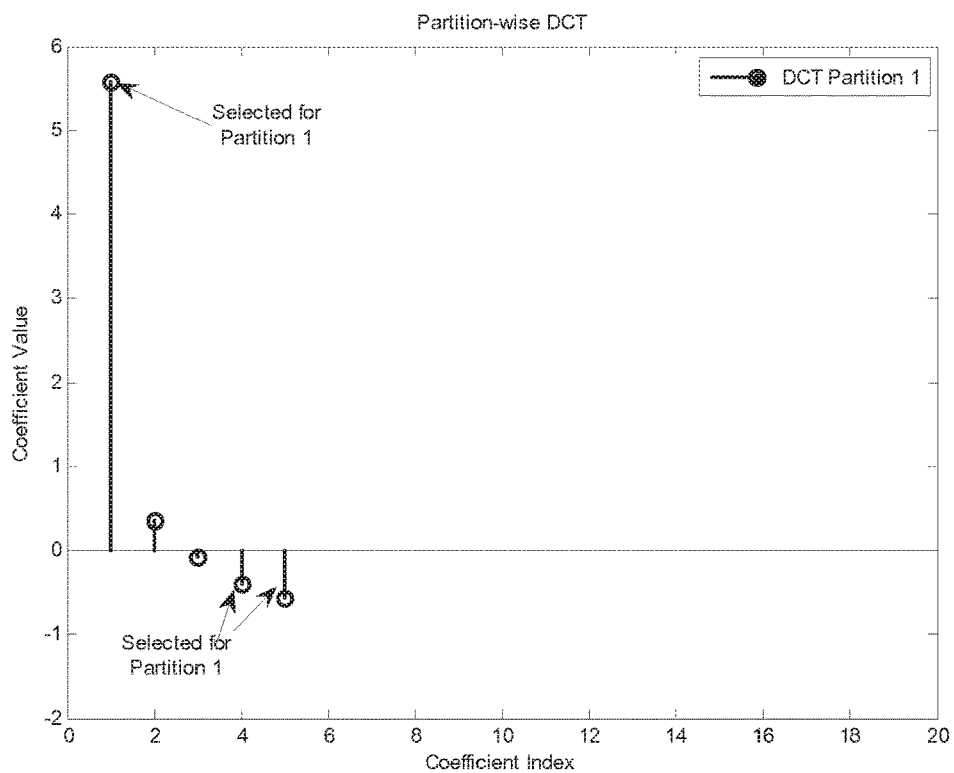
FIG. 16 shows the result of partition-wise DCT for the first partition of channel quality values from FIG. 14, and indicates the three strongest DCT components that may be chosen for transmission, according to an exemplary embodiment of the invention.

For example, the DCT coefficients for the first partition $T_1$ according to FIG. 16 (obtained by squaring and normalization) respectively contain 98.07%, 0.41%, 0.02%, 0.5%, and 1% of the total power. Consequently to capture more than 99% of the power, the selection of coefficients 1 and 5 (i.e., $c_1^1$ and $c_5^1$) of partition $T_1$ may be sufficient. Assuming that a total number of 6 coefficients can be selected for transmission in the encoding procedure 404, the remaining 4 coefficients can then be selected from the second partition (see FIG. 17). To save signalling for the second partition, the first four coefficients of the second partition $T_2$ may be selected by default. For higher accuracy, the four strongest coefficients of partition $T_2$ may be selected. In this fashion, coefficients 1, 3, 10, and 11 (i.e., $c_1^2$, $c_3^2$, $c_3^2$, and $c_{11}^2$) may be selected in the example. These coefficients contain almost 88% of the power of partition $T_2$.

Without using this threshold power criterion for selecting the coefficients from the transformed partitions for transmission, the power contained in the selection for partition $T_1$ is 99.57% (i.e., a gain of 0.5%), while for partition $T_2$ it is only roughly 85.38% (i.e., a loss of about 2.5%) given that three strongest coefficients from each partition are chosen. Depending on the constraints imposed by the communication system, those skilled in the art will be able to select the most suited coefficients from the partitions as needed.

Next, in step 405 the selected channel quality coefficients from the partitions are transmitted as channel quality information to the receiving entity. Depending on the encoding scheme it may also be necessary to encode information indicating the partitioning (partition affiliation) of the channel quality values at the transmitter, for example, by means of a bit pattern as shown in FIG. 15. Further, if no preconfigured coefficients from the partitions are selected it may be necessary to further inform the receiver which coefficients are communicated by signalling the indices of coefficients (coefficient index signalling) included in the channel quality information.

Figure 5:
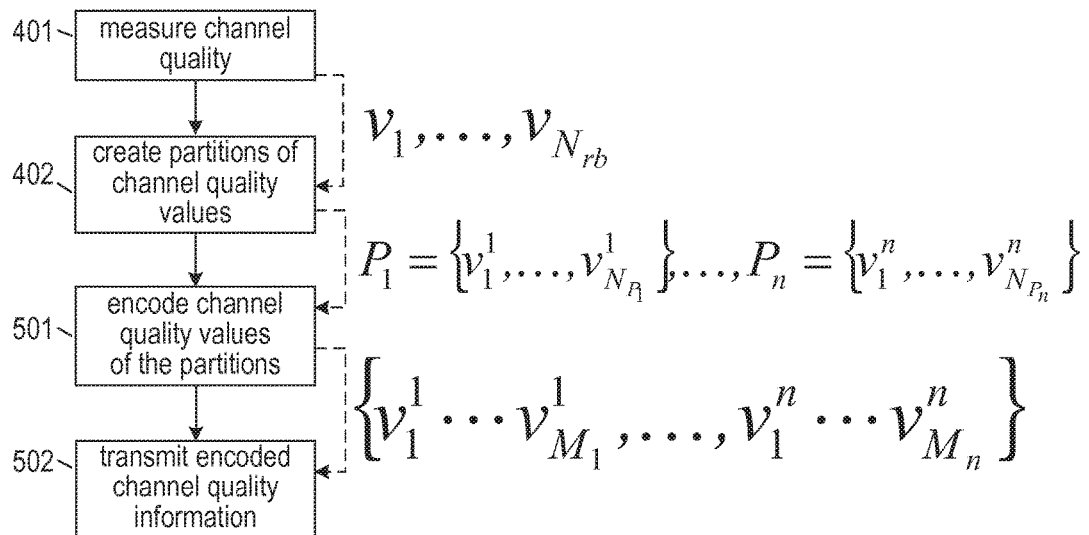
FIG. 5 shows a flow chart of a method for transmitting channel quality information according to an embodiment of the invention, wherein no transformation of channel quality values is performed.

FIG. 5 shows another exemplary flow chart of a method for transmitting channel quality information according to an embodiment of the invention. Essentially, the flow chart shown in FIG. 5 is similar to same in FIG. 4. In contrast to the scheme outlined with respect to FIG. 4 above, the channel quality information transmission scheme shown in FIG. 5 does not include a transformation of the partitions $P_1$ and $P_2$ prior to encoding. Instead, the channel quality values $v_i$ of the respective partitions may be directly encoded 501 using similar mechanisms as described with respect to FIG. 4 above and are subsequently transmitted 502 as channel quality information to the receiver.

Figure 6:
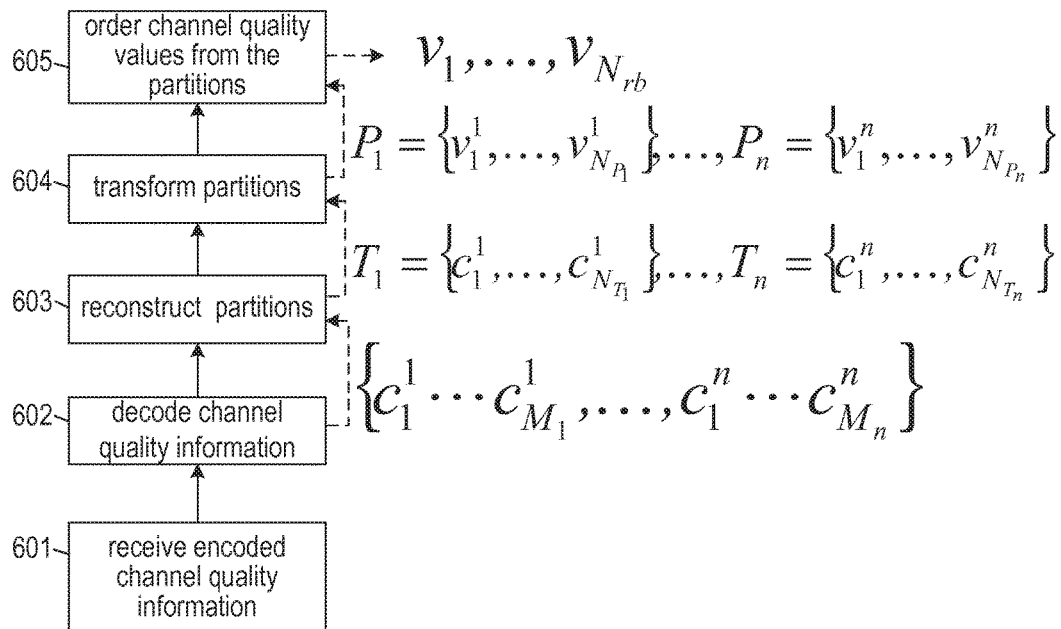
FIG. 6 shows a flow chart of a method for reconstructing channel quality values of a channel from received channel quality information according to an embodiment of the invention.

Next the reconstruction of the channel quality information at the receiving entity will be discussed with respect to FIG. 6 and FIG. 7. FIG. 6 shows an exemplary flow chart of a method for receiving and reconstructing channel quality values for channel quality information according to an embodiment of the invention.

FIG. 6 essentially mirrors the steps of FIG. 4 at the receiving entity. First, the channel quality information provided by a transmitter (e.g., a mobile station) is received 601 at the receiver such as a base station having scheduling and/or link adaptation functionality. The channel quality information may then be decoded 602. This means that the channel quality coefficient values (and optionally the indices for the signalled channel quality coefficient values) in the channel quality information are used to first reconstruct the channel quality coefficients that have been selected by the transmitter for transmission in terms of their values and position.

Further, the partitions $T_i$ may be reconstructed 603 based on the partitioning pattern (partition affiliation) in the channel quality information received from the transmitter. Thereby the respective coefficients in the partitions may be either set according to the signalled coefficient values or to zero (or a predetermined value) if a coefficient value is not signalled in the channel quality information.

Upon having reconstructed the partitions $T_i$ same may be transformed 604 to reconstruct partitions $P_i$ of channel quality values. The partitions $P_i$ of channel quality values are subsequently combined to reconstruct the set of channel quality measures $v_1$, K, $v_{24}$ at the receiver for the plurality of resource units.

Figure 7:
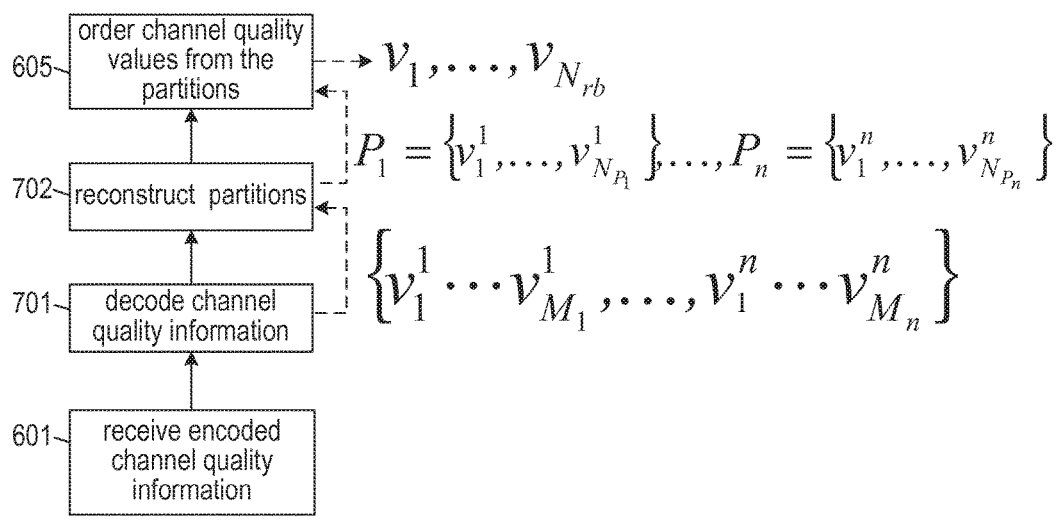
FIG. 7 shows a flow chart of a method for reconstructing channel quality values of a channel from received channel quality information according to an embodiment of the invention, wherein no transformation of channel quality coefficients to channel quality values is performed.
Figure 8:
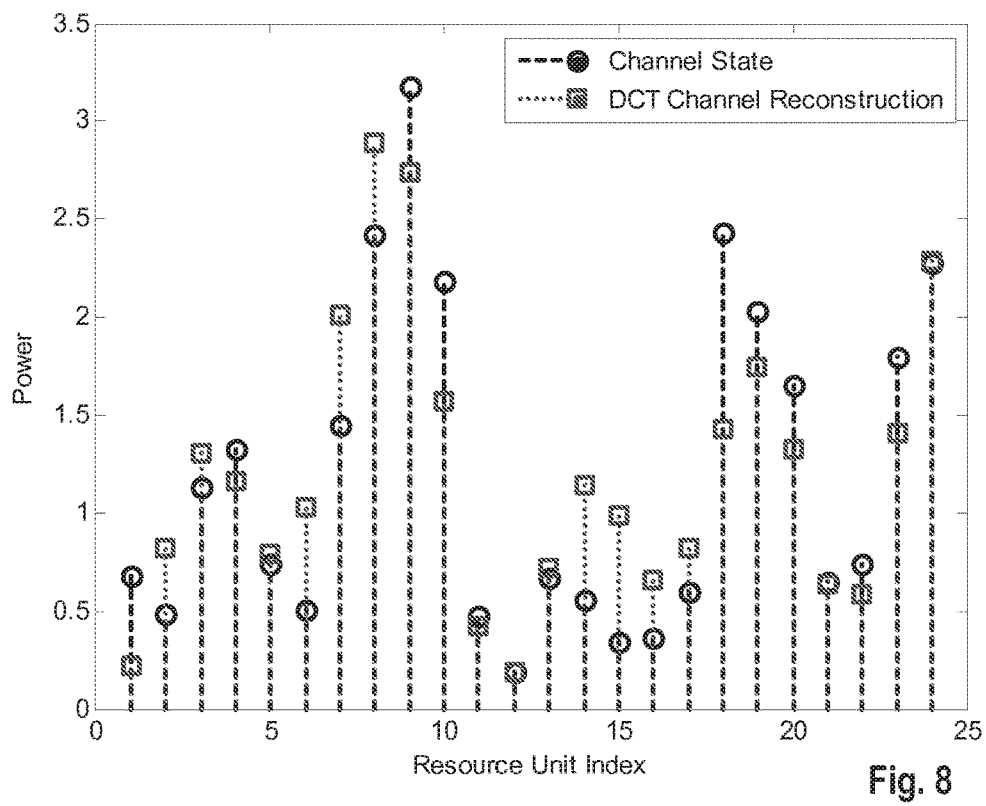
FIG. 8 shows an exemplary snapshot of channel quality values (here "power") for a sequence of 24 resource blocks for a radio channel, and the corresponding reconstruction using compressed Strongest 5 DCT transmission.
Figure 9:
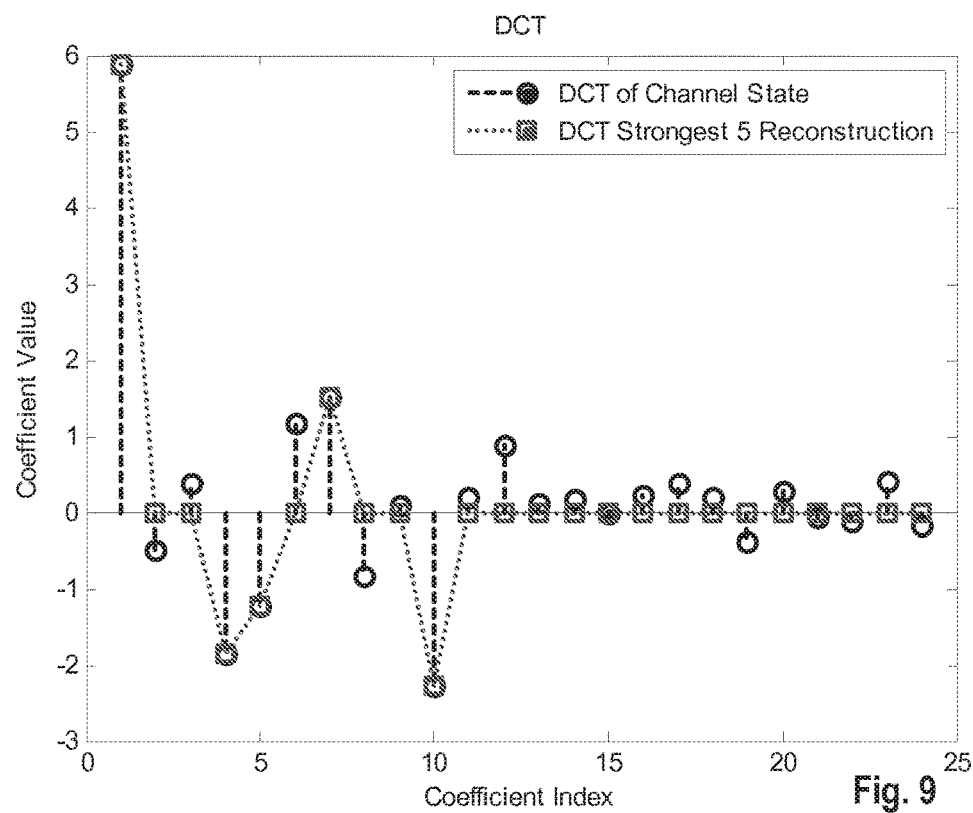
FIG. 9 shows the full DCT and the strongest 5 DCT components for the channel in FIG. 8.
Figure 11:
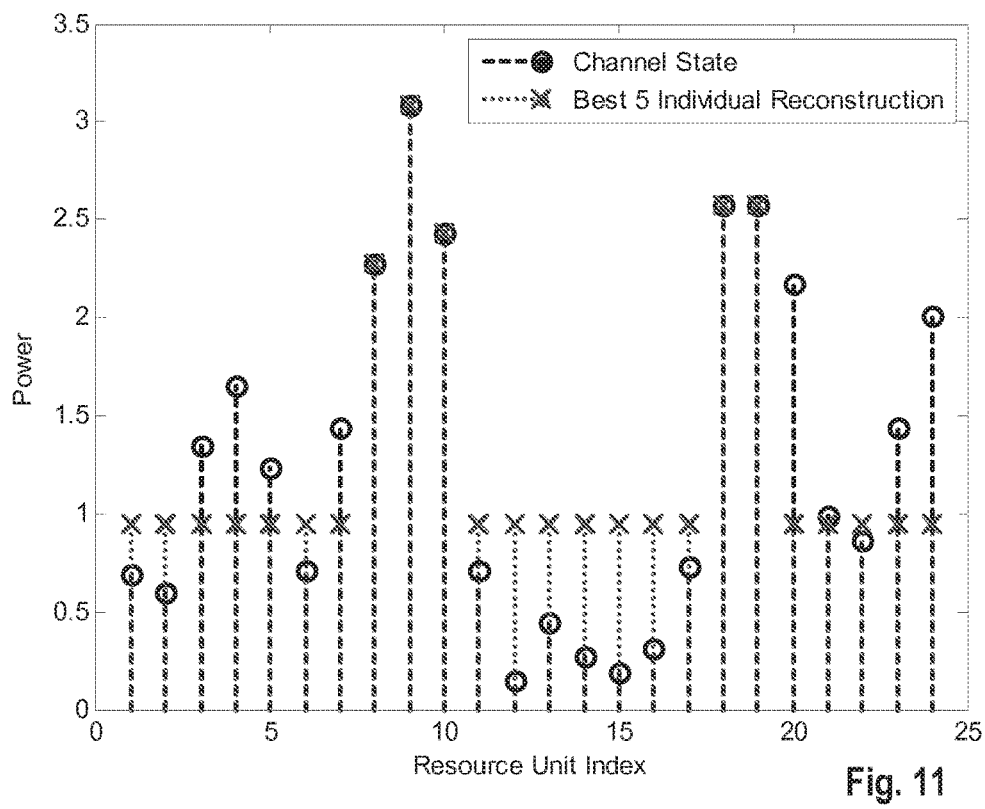
FIG. 11 shows an exemplary snapshot of channel power values for a sequence of 24 resource blocks for a radio channel, and the corresponding reconstruction using a "Best 5 Individual" compression of the channel quality values.
Figure 12:
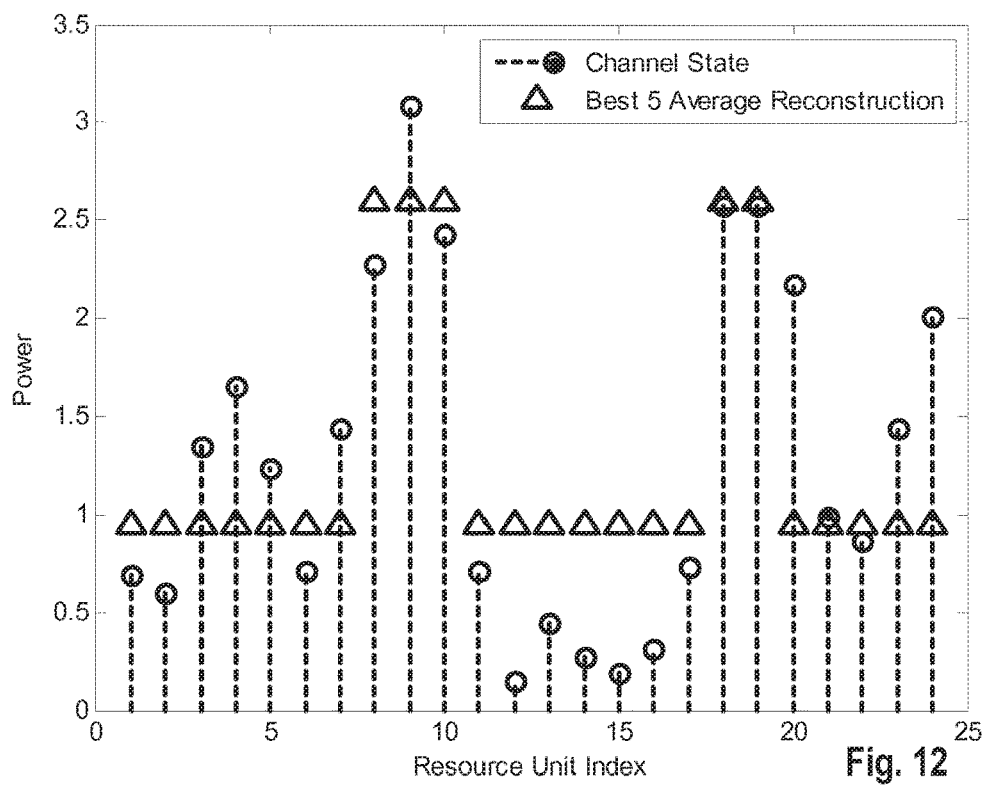
FIG. 12 shows an exemplary snapshot of channel power values for a sequence of 24 resource blocks for a radio channel, and the corresponding reconstruction using a "Best 5 Average" compression of the channel quality values.

FIG. 7 shows another exemplary flow chart of a method for receiving and reconstructing channel quality values for channel quality information according to an embodiment of the invention. Essentially, the individual steps shown in FIG. 7 are similar to those shown in FIG. 6. However, as in FIG. 5, it is assumed that the channel quality values of the partitions $P_i$ are directly encoded and transmitted to the receiver. Hence, upon the reception of the partitions $P_i$ of channel quality values may be directly reconstructed 702 from the channel quality information by a decoder in step 701.

Figure 20:
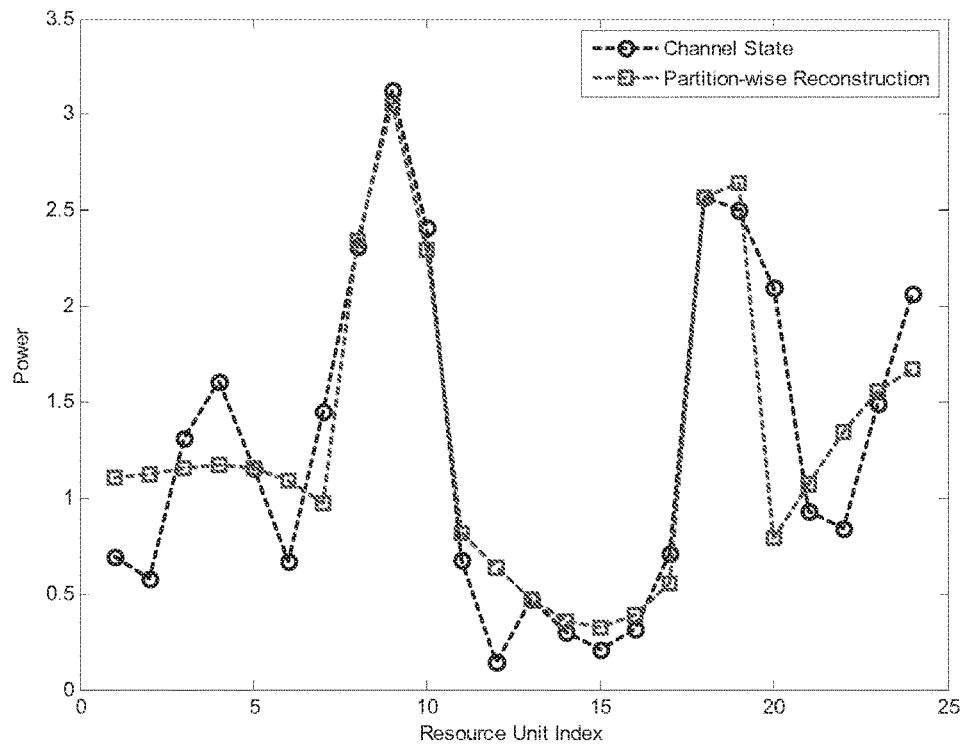
FIG. 20 shows the channel state as in FIG. 14 and a reconstruction of channel quality values from compressed partition-wise DCT according to an exemplary embodiment of the invention.

FIG. 20 shows the channel state as in FIG. 14 and a reconstruction of channel quality values from compressed partition-wise DCT according to an exemplary embodiment of the invention. The partitioning of the channel quality values in two partitions and the partition-wise encoding of channel quality coefficients by selecting $M_1=M_2=3$ coefficients from each partition allows for an accurate reconstruction of the original sequence of channel quality measures. It is especially worth noting that for the most important resource units (i.e., those having the highest channel quality values) the reconstruction is very accurate.

The reason for the accurate reconstruction of the channel quality values from the channel quality information at the receiver when using one of the schemes according to the different embodiments of the invention will be outlined in the following with respect to FIG. 22 to FIG. 27.

Figure 22:
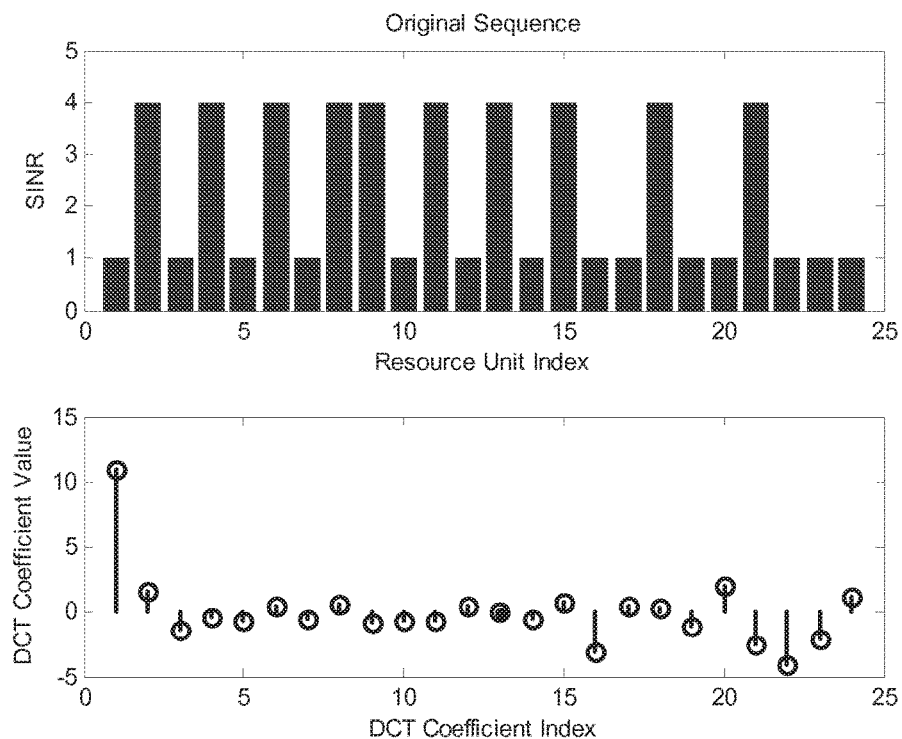
FIG. 22 shows an example of an original sequence consisting of only two distinct SINR values, and the corresponding DCT transform.
Figure 23:
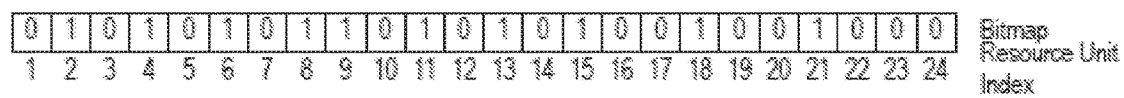
FIG. 23 shows an example how the resource blocks of FIG. 22 may be grouped into two partitions according to an exemplary embodiment of the invention.

FIG. 22 shows an example of an original sequence consisting of only two distinct SINR values, and the corresponding DCT transform. It should be noted that the presence of only two distinct channel quality values in this example is only intended to illustrate the benefits of employing the present invention. As can be seen from the DCT transformation of the original sequence of channel quality values, there is a strong DC component and several higher-index DCT coefficients representing a substantial part of the power of the original sequence. Hence, the number of coefficients to represent a given power threshold value of $P_{threshold}=99\%$ is significant and still implies a significant overhead.

Figure 24:
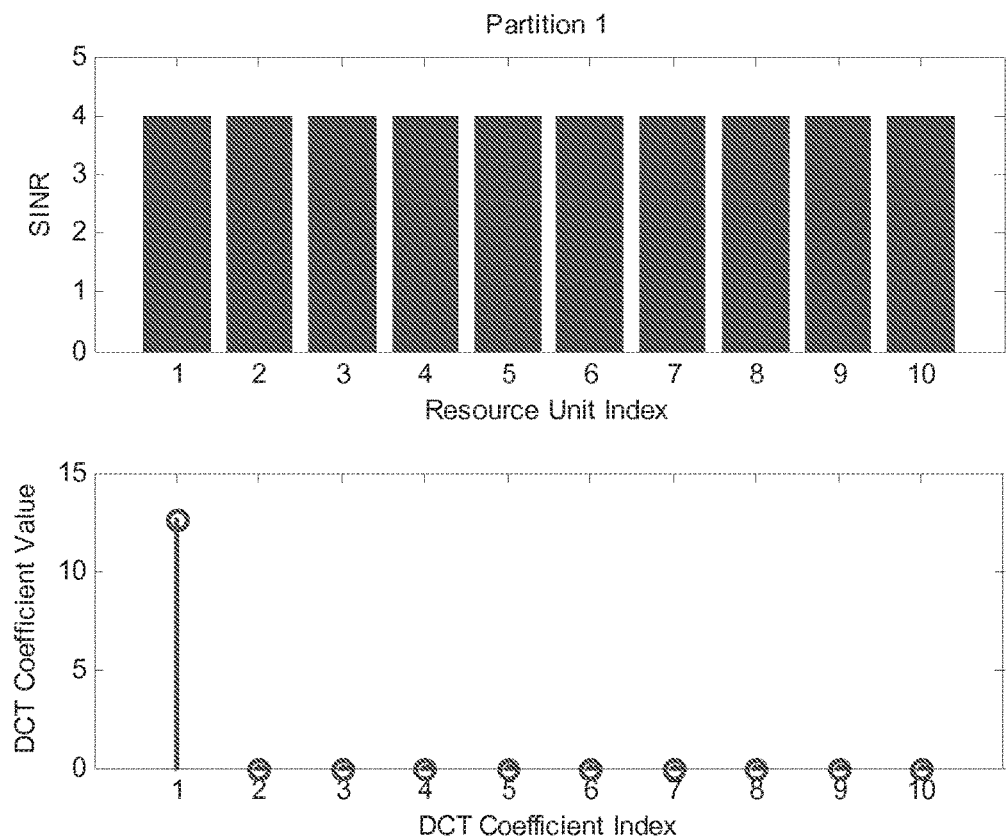
FIG. 24 shows the result of partitioning the resource blocks of FIG. 22 into partition 1, and the corresponding DCT transform of partition 1, according to an exemplary embodiment of the invention.
Figure 25:
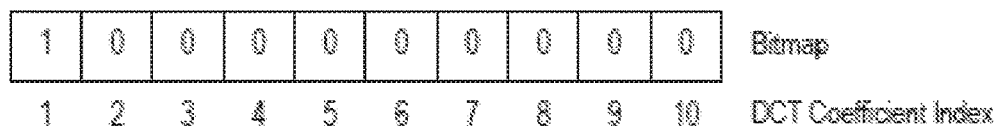
FIG. 25 shows an exemplary bitmap for signalling the strongest DCT component of the partition 1 DCT of FIG. 22, according to an exemplary embodiment of the invention.
Figures 26, 27:
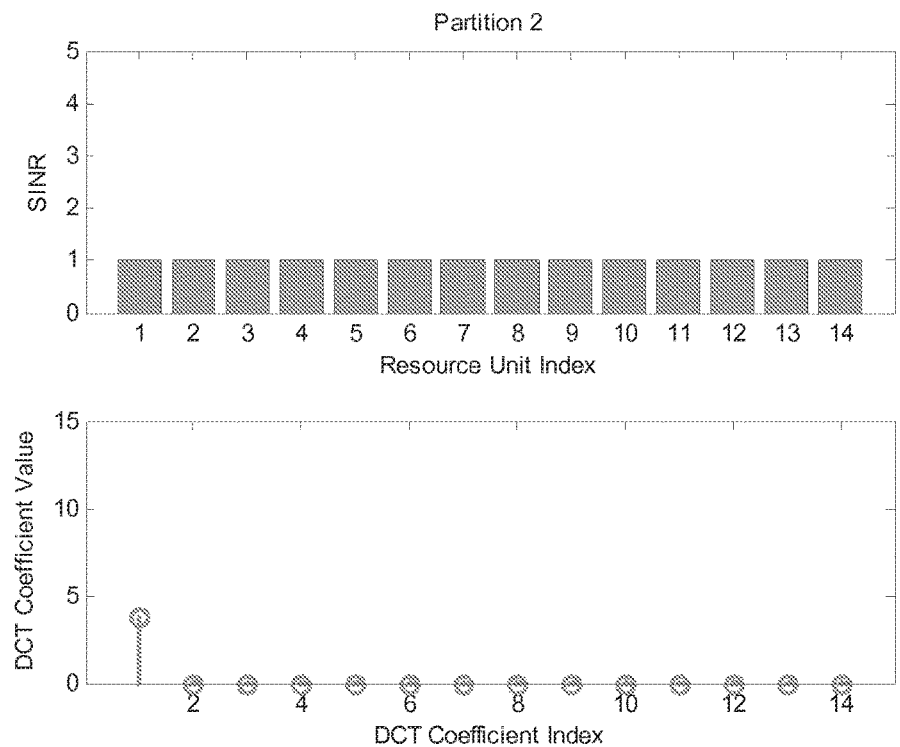
FIG. 26 shows the result of partitioning the resource blocks of FIG. 22 into partition 2, and the corresponding DCT transform of partition 2 according to an exemplary embodiment of the invention.
FIG. 27 shows the bitmap to signal the strongest DCT component of the partition 2 DCT of FIG. 22 according to an exemplary embodiment of the invention.

Partitioning the channel quality values shown in the upper part of FIG. 22 into two partitions in this example allows for having a more regular distribution of channel quality values in each of two partitions. Comparing the exemplary original sequence of channel quality values as in FIG. 22, two partitions may be created that comprise channel quality values of resource units with values of 4 and 1, respectively. Consequently the first partition contains only elements of having a channel quality value equal to 4 as shown in FIG. 24 upper part (i.e., elements $v_1$, $v_2$, $v_4$, $v_6$, $v_8$, $v_9$, $v_{11}$, $v_{13}$, $v_{15}$, $v_{18}$, $v_{21}$ of the original sequence), while the second partition contains only elements having a channel quality value equal to 1 as shown in FIG. 26 upper part (i.e., elements $v_1$, $v_3$, $v_5$, $v_7$, $v_{10}$, $v_{12}$, $v_{14}$, $v_{16}$, $v_{17}$, $v_{19}$, $v_{20}$, $v_{22}$ to $v_{24}$ of the original sequence). The partitioning may either be achieved by defining that the first partition should contain 10 elements and the second partition 14 elements, or a partition threshold of a value between 1 and 4 may have been defined.

As can be seen from FIG. 24 and FIG. 26, the distribution of channel quality values in each of the partitions is more regular in comparison to the original sequence shown in FIG. 22. Due to this more regular distribution of the channel quality values in the two partitions (in this example a uniform distribution is obtained), the power of the DCT coefficients of each of the two partitions shown in FIG. 24 and FIG. 26 in the lower part, respectively, may be concentrated in the first coefficients of the DCT transform. In this example, due to the uniform distribution of the values in each partition, the total power of the channel quality values of a partition concentrates in the DC component of the DCT transform as can be also seen from the bitmaps indicating the strongest coefficients shown in FIG. 25 and FIG. 27 respectively.

This effect allows in turn reducing the number of coefficients that need to be transmitted. In the example, it is sufficient to transmit the value of the DC component of the DCT transform (i.e., the first coefficient) of each partition as well as information on the partitioning (partition affiliation) of the values/coefficients (and optionally the index of the transmitted DC component in the respective partition) to allow for an ideal reconstruction of the original sequence of the channel quality values of FIG. 22 at the receiver. Thereby, the overhead for transmitting these channel quality information to the receiver may be less than in prior-art schemes.

In the subsequent sections several issues relating to the invention according to one of the different embodiments will be discussed in the following.

Transformation Scheme/Encoding Scheme

In the previous sections, it has been suggested to facilitate a better compression of the information to transmit by applying the DCT transform to the data in the individual partitions. Due to the nature of the constituent cosine waveform, the use of a DCT may, for example, be particularly applicable when the data in the partitions is of continuous nature or in cases of discrete nature of the data, if the discrete values do not show large differences to each other. According to another embodiment, also other transformation schemes may be employed, such as, for example, the Fourier transform or other related continuous functions. Further, also other transform functions may be used, such as the Haar transform, Hankel transform, Daubechies wavelet, etc. Use of the latter transforms may be advantageous, for example, in case of a more discrete nature of the data in the partitions (as it might be the result of a coarse quantization of the channel quality values or a result of mapping of the channel quality values onto modulation and coding scheme (MCS) indices). Those skilled in the art will recognize that the optimum compression transformation function will depend on the nature and properties of the data that is to be compressed.

In most embodiments of the invention discussed previously herein, all partitions have been encoded or compressed using the same encoding/compression scheme. Alternatively, each partition may employ a compression scheme independently from any other partition. For example, a first partition may be compressed employing the discrete cosine transform, while another partition may be compressed using a Daubechies wavelet. From an implementation aspect however, it may be advantageous to employ the same compression approach in all partitions, so as to minimize the hardware or software efforts necessary.

Further according to another embodiment of the invention it may be beneficial not to transform the channel state measures prior to encoding, but—for at least one partition—to compress the values directly by transmitting only a subset of the values in a partition. This may lead to a kind of "Best M" compression, as outlined in the Technical Background section, however, on a partition-basis.

It should be noted that the choice of transform or encoding schemes or parameters for at least one partition may vary over time. An option to determine the transform or encoding scheme or parameters for at least one partition may take the channel quality information reporting frequency into account. For example, if channel quality information reporting occurs infrequently (e.g., at a rate below a threshold frequency), it may be advantageous to transmit a large number of values/coefficients to allow very detailed reconstruction, or alternatively to choose an encoding scheme that offers a high amount of accuracy such as "DCT Strongest M" or "Best M Individual".

In contrast, if channel quality information reporting occurs frequently (e.g., at a rate equal to or above a threshold frequency), each channel quality information signal (message) may preferably be rather small, so as to keep the overall required amount of signalling small. This may result in the choice of a few number of values/coefficients or in the choice of a quite coarse encoding scheme like "Average", "Best M Average", or "DCT First M".

In another embodiment, for a given first channel quality information reporting frequency, a first transform or first encoding scheme or first set of channel quality information transmission parameters (such as number of transmitted values/coefficients, number of partitions, number of values in a partition, partition threshold values, etc.) is used. For channel quality information reports between two such channel quality information reports, a second transform or second encoding scheme or second set of channel quality information transmission parameters is used.

Similarly, also in case the channel state changes significantly between successive reports (e.g., the difference between the total energy of one or a plurality of channel quality measures at two time instants is above a threshold) the transmitter may decide to transmit a large number of values/coefficients to allow very detailed reconstruction, or alternatively to choose an encoding scheme that offers a high amount of accuracy.

Reordering

Figure 29:
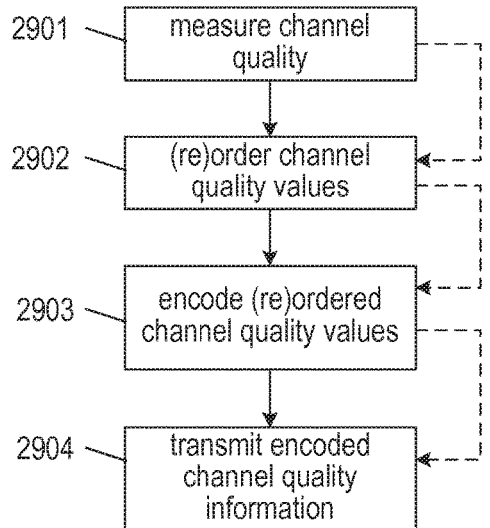
FIG. 29 shows an exemplary flow chart of a method for transmitting channel quality information using a reordering (re)mechanisms according to an embodiment of the invention and FIG. 30 shows another exemplary flow chart of a method for transmitting channel quality information using a reordering (re)mechanisms and transformation of the channel quality values according to another embodiment of the invention.
Figure 30:
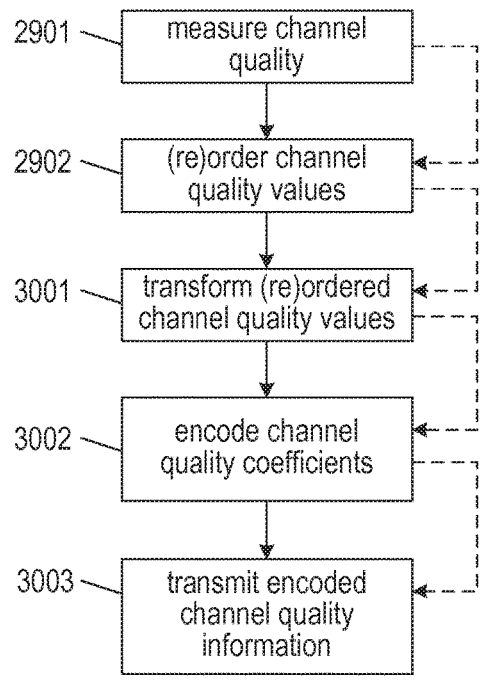

As outlined above, another aspect of the invention is the (re)ordering of channel quality values, for example, in combination with using an encoding scheme employing a transformation of the channel quality values. FIG. 29 and FIG. 30 show exemplary flow charts of a method for transmitting channel quality information using (re)ordering mechanisms according to different embodiments of the invention. While the embodiment shown in FIG. 29 does not employ partitioning and transforming the channel quality values, the embodiment shown in FIG. 30 further includes steps to transform the (re)ordered channel quality values prior to transmission. It should be noted that in both embodiments, also a partitioning of the channel quality values prior to or after (re)ordering may be foreseen.

As in FIG. 4 and FIG. 6, the channel quality values $v_1$, $\Lambda$, $v_{N_{rb}}$ indicative of the channel quality may be either first measured 2901 or may be available at the transmitter. Next, the channel quality values may be (re)ordered 2902 to obtain a sequence of (re)ordered channel quality values $v'_1$, $\Lambda$, $v'_{N_{rb}}$. Subsequently, in the embodiment illustrated in FIG. 29, the (re)ordered channel quality values are encoded 2903 using one of the compression schemes described herein. In the embodiment shown in FIG. 30, the (re)ordered values may be transformed 3001, for example, using a DCT transformation as explained above first and are subsequently encoded 3002 using one of the compression schemes described herein. The resulting channel quality information is subsequently reported 2904, 3003 to the receiver.

The reordering in step 2902 may be done according to various different mechanisms. For example, a known (re)ordering mechanism may be applied that is also known to the receiver. This would obviously require no additional signalling overhead.

In another embodiment of the invention, a limited number $N_r$ of (re)ordering mappings are determined, for example, by means of applying interleaving scheme(s) in a trial-and-error fashion. The transmitter may obtain the reordered sequences of channel quality values using each of the defined (re)ordering algorithms prior to transformation, thus obtaining $N_r$ reordered sequences. Out of these sequences, the transmitter may choose one (re)ordered sequence for transmission (e.g., after transformation and selection of the coefficients/values) that fulfils a certain optimality criterion. Such an optimality criterion may, for example, be the maximum amount of power contained in the first M coefficients or values in the reordered partition. Another optimality criterion may be the mean square error between the reconstructed sequence of channel quality values and the (measured) original sequence of channel quality values. This criterion would however imply higher transmitter complexity, as the transmitter may need to reconstruct the sequence to determine the mean squared error for choosing the optimum (re)ordering scheme or parameters. This operation of the transmitter may also be considered an iteration of testing the resulting compressed information against an optimality criterion as described above.

In this exemplary embodiment, the (re)ordering signalling merely needs to indicate which out of the $N_r$ defined (re)ordering schemes has been selected. This may only require $\lceil ld(N_{rb}) \rceil$ bits for the (re)ordering signal. Another option would be to define the (re)ordering mapping by at least one reordering parameter and to vary this parameter(s), for example, within a given range of parameter values, so as to obtain the (re)ordering fulfilling a certain optimality criterion. In this variation, only the at least one reordering parameter may be signalled. This may, for example, be realized in a fashion similar to that outlined below for the signalling of the partitioning and coefficients.

It may be noted that the (re)ordering may be applied to the channel quality values before transformation of values to coefficients, or it may be applied to the channel quality coefficients obtained after transformation of the channel quality values. For example, in FIG. 30, the order of functional blocks 2902 and 3001 may be exchanged. Either way the optimality criterion is preferably tested after both the (re)ordering and transformation have been applied.

The (re)ordering of the channel quality values may also be employed together with the concept of partitioning. In one embodiment of the invention, the channel quality values may be (re)ordered prior to their partitioning. In another embodiment of the invention the values or coefficients within a partition may be reordered prior to their transformation or encoding, respectively. This may be particularly beneficial if a compression scheme is employed that is most accurate for small data indices. A further advantage of reordering the channel quality values in a partition may be that the reordering allows achieving a more regular distribution of channel quality values in a partition, which in turn yields that most power of the reordered partition values may be found in only a very low number of coefficients of the DCT transform. Hence, according to one embodiment, the reordering is performed such that the reordered partition has a more regular distribution of channel quality values than the original partition prior to reordering. The (re)ordering may be, for example, a sorting or shifting of channel quality values in a partition. Those skilled in the art will perceive that the method of (re)ordering may be in some way known to the receiver e.g., by signalling or convention.

Generally, the (re)ordering of the data may be signalled to the receiver as well in the channel quality information, unless the (re)ordering algorithm is known a priori (e.g., using a fixed permutation pattern) to both the transmitter and the receiver. Allowing for an arbitrary (re)ordering may impose heavy demands on the amount of bits that need to be signalled to indicate the reordering applied to the data.

Hence, according to one embodiment of the invention one out of a limited number $N_r$ of (re)ordering mappings (e.g., using interleavers) that are employed by the transmitter is determined (e.g., in a trial-and-error fashion). For example, the transmitter may obtain data reordered partitions using each of the defined (re)ordering algorithms prior to transformation, thus obtaining $N_r$ reordered partitions. Out of these, the reordered partition may be chosen for transmission (after compression of the coefficients/values) that fulfils a certain optimality criterion. As mentioned above, such an optimality criterion could be the maximum amount of power contained in the first M coefficients or values in the reordered partition. In this exemplary embodiment, the (re)ordering signalling merely needs to indicate which out of the $N_r$ defined (re)ordering schemes has been selected. This may only require $\lceil ld(N_{rb}) \rceil$ bits for the (re)ordering signal.

Another optimality criterion may be the minimal variance or minimum mean square error when comparing the original channel quality values with the reconstructed channel quality values from the reordered partition. In this exemplary embodiment, the (re)ordering signalling merely needs to indicate which out of the $N_r$ defined (re)ordering schemes has been selected. This may only require $\lceil ld(N_{rb}) \rceil$ bits for the (re)ordering signal.

According to another embodiment of the invention, an interleaver or (re)ordering algorithm is used to generate a number of $N_r$ interleaves or (re)ordering realizations by using at least one variable interleaver or (re)ordering parameter. The particular choice which out of the $N_r$ interleaver or (re)ordering realizations is employed by the transmitter to transmit the channel quality information is determined e.g., in a trial-and-error fashion according to an optimality criterion as above, mutatis mutandis. In this embodiment, the transmitter merely needs to indicate the at least one employed interleaver or (re)ordering parameter value for the selected interleaver or (re)ordering mapping indicating the permutation/interleaving of the input sequence. Alternatively, the transmitter merely needs to indicate which out of the $N_r$ generated realizations has been selected.

The (re)ordering approach may, for example, be particularly advantageous if a "First-M DCT" scheme or similar low-index compression schemes is employed to encode the channel quality values of a partition.

Partitioning of the Channel Quality Values

In most embodiments having been discussed so far, a partitioning according to the channel quality values on a resource unit basis has been used. However other classifications can also be used to create the partitions. In one embodiment, the partitioning is based upon what modulation and coding scheme may be supported by a resource unit at a given target error rate. In another embodiment, the partitioning is based on the variation of the channel within a resource unit, such that resource units with nearly constant channel are grouped in one partition, and resource units with a fluctuating channel are grouped in a second partition. In another embodiment, a combination of classification criteria mentioned is used to create the partitions.

The partitioning may further be determined over each or a combination of the following dimensions:

Time unit (e.g., timeslot, resource block, radio frame, subframe, transmission time interval, millisecond, etc.)
Frequency unit (e.g., transmission bandwidth, carrier bandwidth, subband, resource block, etc.)
Antenna unit (e.g., transmit antenna, receive antenna, antenna array unit, MIMO channel, etc.)
Code unit (e.g., spreading code number or ID)
Polarization angle (e.g., horizontal, vertical, circular, etc.)

Partition Affiliation Signalling

To signal the assignment of a respective resource unit to a respective partition, i.e., the partition affiliation, the following methods may be used:

In one example, a map of a size equal to the number of resource units is transmitted, each map element representing a resource unit index, where e.g., a first value (e.g., "0") signifies assignment to a first partition, and a second bit value (e.g., "1") signifies assignment to a second partition. In case of only two partitions, the map is preferably constructed as a bitmap. Otherwise for each map element multiple bits may be required. The bitmap is exemplified in FIG. 15 as already indicated above.

Another exemplary method is the use of a combination index. For a number of resource units $N_{rb}$, and a number of resource units assigned to a first partition $N_1$, there exist only $$\binom{N_{rb}}{N_1}$$

combinations of possible assignments. Therefore it is sufficient to signal which of these $$\binom{N_{rb}}{N_1}$$

combinations is transmitted. This requires $$\left\lceil ld\binom{N_{rb}}{N_1} \right\rceil$$

bits. In case of only two partitions, it is sufficient to signal the assignment of resource units to one partition, as the remaining resource units automatically belong to the other partition. To reduce the signalling in this case, it may be advantageous that the signalling is done for the partition that contains fewer resource units.

Partition Value/Coefficient Signalling

As indicated above, if not using an encoding scheme where the indices of the signalled channel quality coefficients or values are known to the receiver a priori, it may be necessary to signal the indices of the transmitted coefficients or values. For each partition, the indices of the signalled coefficients or values may be signalled in the following fashions:

A bitmap of a size equal to the size of the partition may be transmitted, each bit representing a value/coefficient index, where a first bit value (e.g., "0") signifies no transmission of the respective value/coefficient, and a second bit value (e.g., "1") signifies transmission of the respective value/coefficient. This method imposes no a priori restriction on the number of values/coefficients to be transmitted. This solution is exemplified in FIG. 13, FIG. 18, FIG. 19, FIG. 23, FIG. 25 and FIG. 27.

Combination Index; assuming that the number of transmitted coefficients $M_p$ and the total number of coefficients in a partition $M_0$ are known, there exist (basic statistics) only $$\binom{M_0}{M_p}$$

combinations of possible coefficient transmissions. Therefore it is P sufficient to signal which of these $$\binom{M_0}{M_p}$$

combinations is transmitted. This requires $$\left\lceil ld\binom{M_0}{M_p} \right\rceil$$

bits. This may be done for each partition individually. The approach may P be applied to transmitted values instead of transmitted coefficients mutatis mutandis.

The coefficients are signalled for both partitions jointly; There can be a bitmap equal to the number $M_0$ of coefficients for all partitions, where the first $M_1$ bits represent the coefficient indices of the first partition, and the final $M_2$ bits represent the coefficient indices of the second partition $M_1+M_2=M_0$. A first bit value (e.g., "0") signifies no transmission of the respective coefficient, and a second bit value (e.g., "1") signifies transmission of the respective coefficient. This approach may be applied to values instead of coefficients mutatis mutandis.

Also for signalling the coefficient indices a combination index may be used. The coefficients may, for example, be signalled for both partitions jointly; assuming that the total number of transmitted coefficients for all partitions together is $M_s$ and the total number of coefficients for all partitions $M_0$ are known, there exist only $$\binom{M_0}{M_s}$$

index combinations of possible coefficient transmissions. Therefore it is sufficient to signal which of these $$\binom{M_0}{M_s}$$

index combinations is transmitted. This requires $$\left\lceil ld\binom{M_0}{M_s} \right\rceil$$

bits. This approach may be applied to values instead of coefficients mutatis mutandis.

In all of the above options, any DC component of any partition may be exempted from signalling if it is always transmitted. Persistent transmission of the DC component may be advantageous since this is equivalent to the average power level within a partition. With the numerology defined above, e.g., instead of $$\left\lceil ld\binom{M_0}{M_p} \right\rceil, \text{only} \left\lceil ld\binom{M_0-1}{M_p-1} \right\rceil$$

bits are necessary for the coefficient index signalling. Similarly other indices may be designated a priori for persistent transmission, up to the extreme that always the identical coefficient indices are transmitted. Obviously in the latter case there is no need for signalling the indices for such a partition. Generally this may be done separately for each partition, or for the indices of all partitions, so that there would be no index signalling at all.

Assuming that there are two partitions, and that the signalling for the assignment to partitions (partition affiliation) as well as for the transmitted coefficient indices uses a combination index, respectively, and furthermore assuming that the DC component for each partition is always transmitted, we may calculate the number of required bits for signalling for the proposed scheme as $$D \cdot (M_1+M_2) + \left\lceil ld\binom{N_{rb}}{M_0} \right\rceil + \left\lceil ld\binom{M_0-1}{M_1-1} \right\rceil + \left\lceil ld\binom{N_{rb}-M_0-1}{M_2-1} \right\rceil,$$

where for clarity reasons the partition affiliation and value/coefficient index fields are separated. If these are combined into a single index field, some bit(s) may be saved additionally, as the number of required bits may then be calculated as $$D \cdot (M_1+M_2) + \left\lceil ld\binom{N_{rb}}{M_0} + ld\binom{M_0-1}{M_1-1} + ld\binom{N_{rb}-M_0-1}{M_2-1} \right\rceil$$

Reduced Partition Value/Coefficient Signalling

As identified previously, the signalling of the value/coefficient indices typically makes up a non-negligible part of the required signalling. Therefore it may be advantageous to use only a single value/coefficient index signal field that is valid for more than one partition.

Figure 18:
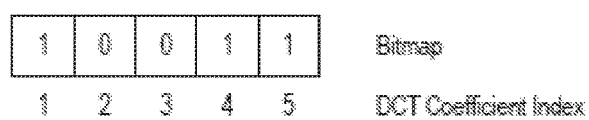
FIG. 18 shows an exemplary bitmap for signalling which DCT components are transmitted for the first partition with respect to the strongest-three criterion according to FIG. 16 according to an exemplary embodiment of the invention.
Figure 19:
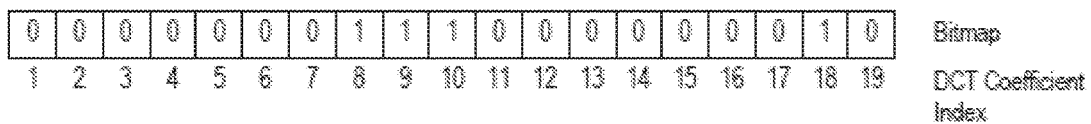
FIG. 19 shows an exemplary bitmap for signalling which DCT components are transmitted for the second partition with respect to the strongest-three criterion according to FIG. 17 according to an exemplary embodiment of the invention.
Figure 17:
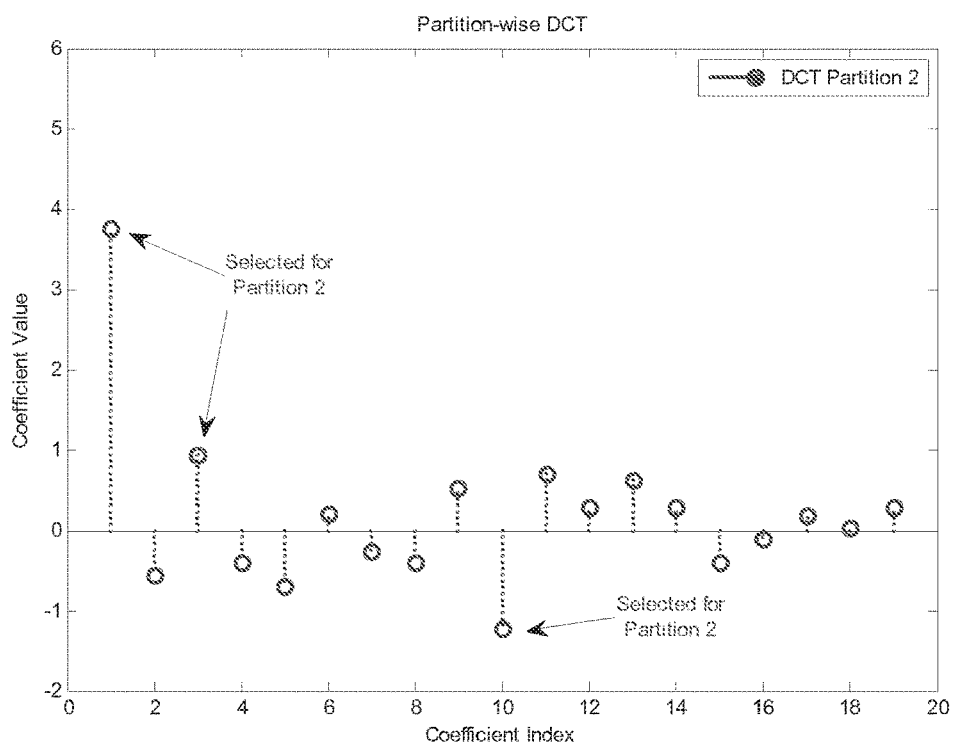
FIG. 17 shows the result of partition-wise DCT for the second partition of channel quality values from FIG. 14, and indicates the three strongest DCT components that may be chosen for transmission, according to an exemplary embodiment of the invention.

In the example of FIG. 16 and FIG. 17, it has been determined that for the first partition, three coefficients should be chosen for compressing the coefficients of partition $T_1$, and the same number of coefficients for partition $T_2$. Considering the "strongest" criterion for partition $T_1$, coefficients $c_1^1$, $c_4^1$, and $c_5^1$, should be chosen for transmission, as also shown in FIG. 18. In order to save the signalling for the coefficients of partition $T_2$, the coefficients at the same indices may be chosen for transmission, i.e., coefficients $c_1^2$, $c_4^2$, and $c_5^2$. Obviously these coefficients may generally not be the strongest coefficients of partition $T_2$. In principle the choice of what coefficients are transmitted may be based on any partition. In one embodiment, the coefficients are chosen so as to represent the strongest coefficients in the partition representing the strongest resource units. In another embodiment, the choice of coefficients is based upon the coefficient-wise average magnitude of at least two partitions.

In case that there is not an equal number of coefficients for the partitions, a coefficient for a non-existent index in a partition may be set to a "virtual" zero for the purposes of reduced signalling. For example, if coefficient $c_{10}$ had been chosen for transmission of both partitions, the value transmitted for partition $T_1$ should be zero, as the transform for partition one contains only 5 coefficients. Likewise if averaging is used according to one of the mentioned embodiments, a coefficient for a non-existent index in a partition may be set to a "virtual" zero for the purposes of determining the coefficient-wise average magnitude of at least two partitions.

Figure 21:
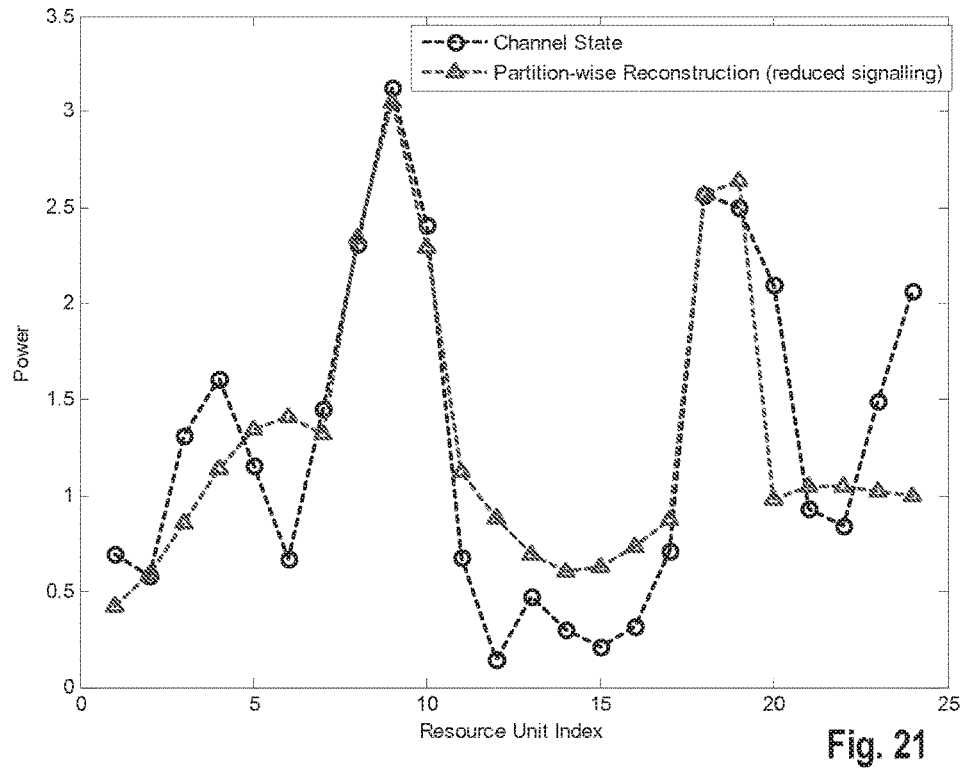
FIG. 21 shows the channel state as in FIG. 14 and a reconstruction of channel quality values from compressed partition-wise DCT with reduced coefficient signalling overhead according to an exemplary embodiment of the invention.

The effect of the reduced coefficient signalling, using the same coefficients for partition $T_2$ as for partition $T_1$, can be seen in FIG. 21. FIG. 21 illustrates the channel state as in FIG. 14 and a reconstruction of channel quality values from compressed partition-wise DCT with reduced coefficient signalling overhead according to an exemplary embodiment of the invention. The reconstruction of the channel quality values based on a reduced amount of channel quality information shows larger deviations from the true channel than the reconstruction including the full partition coefficient signalling. However the saving in signalling information may justify this loss.

Table 2 below illustrates the channel quality values of the channel as well as the reconstructed channel quality values using an encoding scheme as suggested with respect to FIG. 14, FIG. 16 and FIG. 17 as well as the reconstructed channel quality values using an encoding scheme as suggested with respect to FIG. 14, FIG. 16 and FIG. 17 and in addition reducing the signalling information further, by signalling the coefficients of partition $T_2$, the coefficients at the same indices may be chosen for transmission for partition $T_1$, i.e., coefficients $c_1^2$, $c_4^2$, and $c_5^2$ as discussed above. A graph of the numerical values is shown in FIG. 20 and FIG. 21 respectively.

| Resource Unit Index | Channel State | Partition-wise Reconstruction | Partition-wise Reconstruction (reduced signalling) |
|---|---|---|---|
| 1 | 0.69 | 1.11 | 0.43 |
| 2 | 0.58 | 1.12 | 0.59 |
| 3 | 1.31 | 1.15 | 0.86 |
| 4 | 1.61 | 1.17 | 1.14 |
| 5 | 1.15 | 1.15 | 1.35 |
| 6 | 0.67 | 1.09 | 1.41 |
| 7 | 1.45 | 0.97 | 1.32 |
| 8 | 2.31 | 2.35 | 2.35 |
| 9 | 3.12 | 3.06 | 3.06 |
| 10 | 2.41 | 2.30 | 2.30 |
| 11 | 0.67 | 0.81 | 1.12 |
| 12 | 0.15 | 0.64 | 0.89 |
| 13 | 0.47 | 0.47 | 0.70 |
| 14 | 0.30 | 0.36 | 0.61 |
| 15 | 0.21 | 0.32 | 0.63 |
| 16 | 0.32 | 0.39 | 0.74 |
| 17 | 0.71 | 0.55 | 0.87 |
| 18 | 2.57 | 2.57 | 2.57 |
| 19 | 2.50 | 2.64 | 2.64 |
| 20 | 2.10 | 0.79 | 0.99 |
| 21 | 0.93 | 1.07 | 1.04 |
| 22 | 0.85 | 1.34 | 1.05 |
| 23 | 1.49 | 1.56 | 1.02 |
| 24 | 2.07 | 1.67 | 1.00 |

As can be recognized from the table both compression schemes allow for a very accurate reconstruction of the channel quality values for the strongest coefficients of the real channel state. The suboptimum choice of the channel quality coefficients for signalling for the second partition in the reduced signalling scheme in the right column is mainly reflected in the less accurate reconstruction of channel quality values of low power (e.g., for indices 11 to 17). However, these low power measures are typically less relevant, as same should be not be chosen for data transmission by the respective transmitter (i.e., should not be assigned to the terminal for transmission).

It should be noted that the reduced signalling approach outlined here for partition coefficients may be applied to partition values mutatis mutandis.

Channel Quality Value

The channel quality value mentioned herein may be each of or a combination of the following parameters, measures, or values:

Signal-to-Noise ratio (SNR)
Signal-to-Interference ratio (SIR)
Signal-to-Noise-plus-Interference ratio (SINR)
Channel coefficient
Channel gain or attenuation
Modulation scheme indicator
Coding scheme indicator
Modulation and coding scheme ("MCS") indicator It should be obvious to those skilled in the art that the expression that is used widely in the detailed description about "strongest resource units" etc. is referring to a Signal-to-Noise ratio or a Signal-to-Interference ratio or a Signal-to-Noise-plus-Interference ratio, or generally any measure that relates to a signal strength. However the interpretation for other measure mentioned above can be adapted mutatis mutandis. For example, a strong Signal-to-Interference ratio may also be expressed as a modulation scheme indicator that indicates a high-order modulation scheme (e.g., 16-QAM, 64-QAM, etc.), or as a coding scheme indicator that indicates a weak coding scheme (e.g., by a high coding rate), and so forth. Those skilled in the art will readily be able to derive the corresponding interpretations for other measures or combinations of any measures.

A channel quality value may be determined over each or a combination of the following dimensions:

Time unit (e.g., timeslot, resource block, radio frame, subframe, transmission time interval, millisecond, etc.)
Frequency unit (e.g., transmission bandwidth, carrier bandwidth, subband, resource block, etc.)
Antenna unit (e.g., transmit antenna, receive antenna, antenna array unit, MIMO channel, etc.)
Code unit (e.g., spreading code number or ID)
Polarization direction (e.g., horizontal, vertical, circular, etc.)

The following examples of transmission technologies should provide additional understanding to those skilled in the art how to beneficially employ the invention.

In an FDM(A) transmission scheme, $N_{rb}$ data resources are available in frequency domain. Therefore also the channel quality measure may be obtained as a frequency-domain variable of $N_{rb}$ values. A first partition may consequently contain those frequency resource blocks with the $M_1$ strongest channel quality measures, while a second partition contains the remaining $M_2$ channel quality measures. It may be noted that this approach may also be used in the special case of OFDM(A), as it can be seen as a special instance of an FDM(A) transmission.

In a multi-antenna transmission scheme, the channel quality value may vary from one antenna to the other. Those skilled in the art will recognize that this is valid both for transmit and receive antennas. In particular with respect to MIMO technologies, the communication system will generally consist of $N_{MIMO}$ MIMO data streams, for each of which a plurality of channel quality measures may be obtained if e.g., each stream uses an FDM transmission scheme. Consequently a first partition may contain the channel quality measures valid for a first MIMO data stream, while a second partition may contain the channel quality measures for a second MIMO data stream.

Number of Partitions

Most exemplary embodiments relate to the concept of partition-wise compression using two distinct partitions. However the concepts presented can easily be extended into an arbitrary number of partitions.

Hierarchical Partitioning

In another embodiment of the invention not only the original sequence of channel quality values may be partitioned, but also the resulting partitions may be again divided into sub-partitions. Generally, a first partitioning is made to create partitions $A_i$. In a second time instant, the data from at least one of said partitions $A_i$ is further partitioned to create partitions $B_{i,j}$. In this way, i denotes the index of the parent partition, while j denotes the index of the child partition belonging to parent partition i. Compression may be employed in any of the parent or child partitions according to any of the methods outlined in the present invention. This may be used to further increase the granularity and accuracy of the compression and reconstruction.

It may be noted that such hierarchical partitioning may be beneficially employed in a MIMO case. As mentioned above, a first partition $A_1$ may contain the channel quality measures valid for a first MIMO data stream, while a second partition $A_2$ may contain the channel quality measures for a second MIMO data stream. Then a first sub-partition $B_{1,1}$ may contain the strongest channel quality measures contained in partition $A_1$, while a second sub-partition $B_{1,2}$ may contain the remaining channel quality measures contained in partition $A_1$. This can be applied mutatis mutandis to partition $A_2$ and sub-partitions $B_{2,1}$ and $B_{2,2}$.

Transmission of Channel Quality Information

In another embodiment of the invention, the encoded and/or compressed data of all partitions may be transmitted at the same time. However, other solutions may be possible, as outlined in the following.

For example, also a partition-wise successive (serial) transmission of the encoded channel quality information is possible. At a first time instance, the channel quality information for a first partition is transmitted. At a second time instance, the channel quality information for a second partition is transmitted. The order may be predetermined, signalled, or determined according to e.g., a deviation criterion: channel quality information is transmitted for that partition, for which there occurs the biggest change compared to the previous transmitted compressed data for that partition.

Another option is the use of a successive (serial) transmission of the encoded channel quality information components. At a first time instance, a first coefficient of the channel quality information is transmitted. At a second time instance, a second coefficient of the channel quality information is transmitted. This may be employed partition-wise (i.e., the coefficients for a first partition are transmitted before the coefficients for a second partition), or in a round-robin or similar fashion (i.e., a first coefficient is transmitted for a first partition, followed by a first coefficient for a second partition, followed by a second coefficient for the first partition, etc.).

Another option is the use of a successive (serial) transmission of the encoded channel quality information components. At a first time instance, for example, the partition affiliation signal is transmitted, while the value/coefficient signal for the at least one partition is transmitted at an at least second time instance.

A further option is to update channel quality information. According to one embodiment, only the difference of the channel quality information for a partition between a first transmission instance and a second transmission instance is transmitted. Said difference may either refer to the transmitted channel quality information at said first transmission instance, or refer to the combination of several previously compressed data transmission instances.

Another option to transmit the encoded channel quality information according to a further embodiment of the invention may be a partition-wise update/transmission interval. For a first partition, advantageously one that consists mainly of strong resource units, the channel quality information is transmitted using a first update/transmission interval. For a second partition, the channel quality information is transmitted using a second update/transmission interval. Preferably the first update/transmission interval is shorter than the second update/transmission interval.

It should be noted that the aforementioned transmission options in time domain can be easily extended or changed to frequency domain, code domain, antenna domain, polarization domain, etc. mutatis mutandis.

Figure 28:
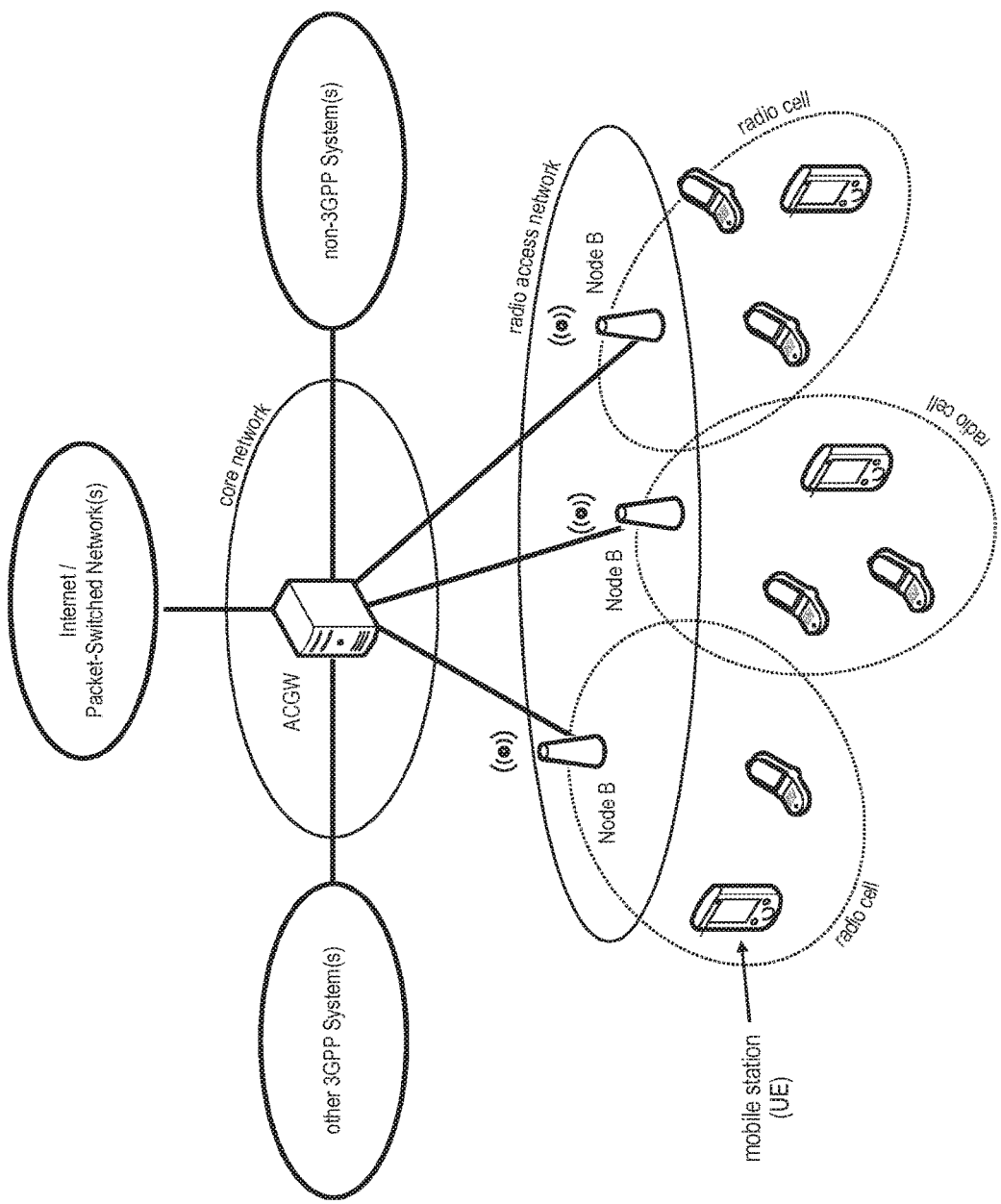
FIG. 28 shows a mobile communication system according to one embodiment of the invention, in which the ideas of the invention may be implemented.

Further, as already briefly mentioned above it is to be noted that the concepts of the invention outlined in various exemplary embodiments herein may be advantageously used in a mobile communication system as described in the Technical Background section that may, for example, have an architecture as exemplified in FIG. 28. The mobile communication system may have a "two node architecture" consisting of at least one Access and Core Gateway (ACGW) and Node Bs. The ACGW may handle core network functions, such as routing calls and data connections to external networks, and it may also implement some RAN functions. Thus, the ACGW may be considered as to combine functions performed by GGSN and SGSN in today's 3G networks and RAN functions as, for example, radio resource control (RRC), header compression, ciphering/integrity protection and outer ARQ. The Node Bs may handle functions as, for example, segmentation/concatenation, scheduling and allocation of resources, multiplexing and physical layer functions. For exemplary purposes only, the NodeBs are illustrated to control only one radio cell. Obviously, using beam-forming antennas and/or other techniques the NodeBs may also control several radio cells or logical radio cells. Further, a MIMO transmission scheme may be utilized in the communication with the different mobile stations or terminals.

Figure 2:
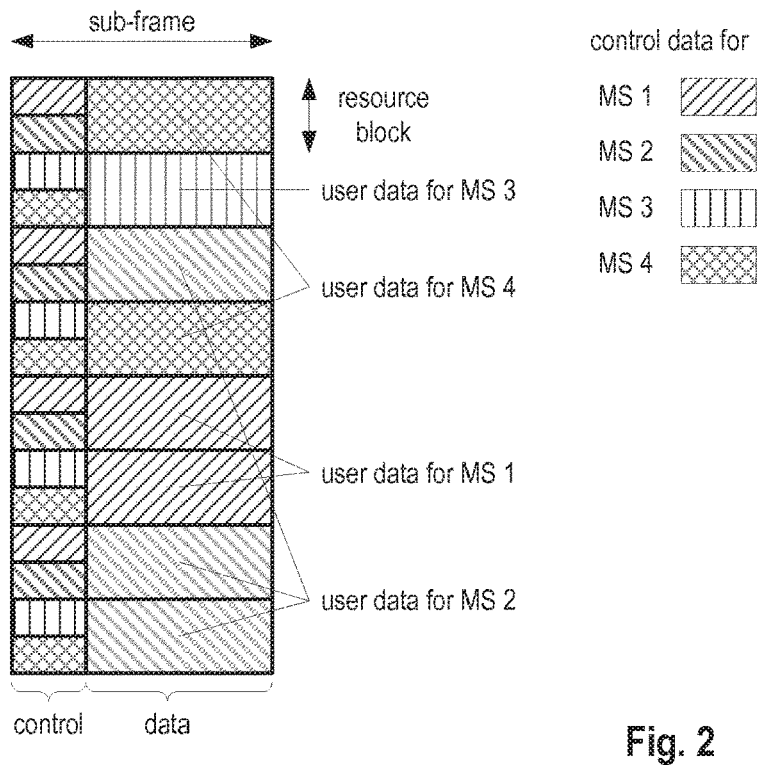
FIG. 2 shows an exemplary data transmission to users in an OFDMA system in localized mode (LM) having a distributed mapping of Layer 1/Layer 2 control signalling.
Figure 3:
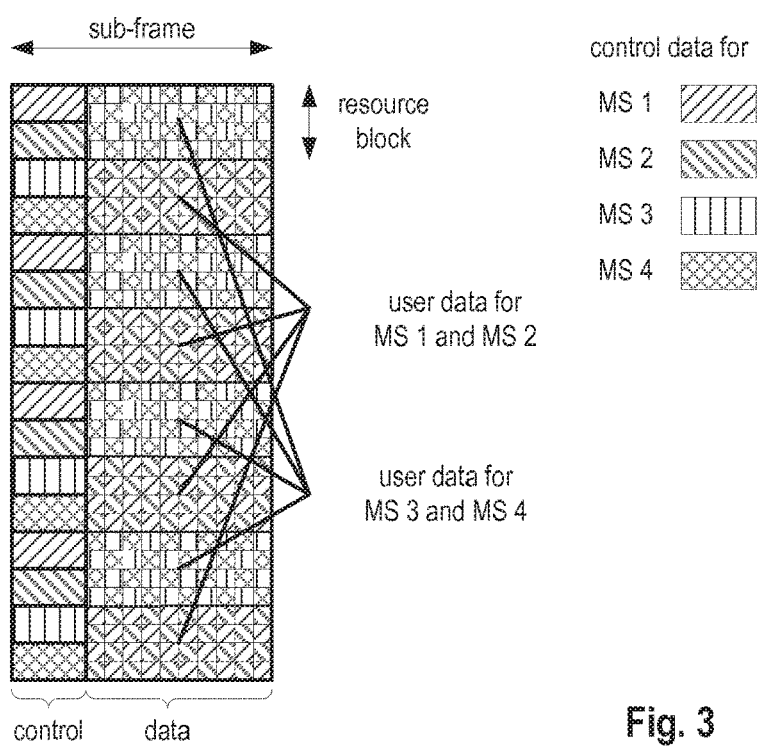
FIG. 3 shows an exemplary data transmission to users in an OFDMA system in distributed mode (DM) having a distributed mapping of Layer 1/Layer 2 control signalling.

In this exemplary network architecture, a shared data channel may be used for communication on uplink and/or downlink on the air interface between mobile stations (UEs) and base stations (NodeBs). This shared data channel may have a structure as shown in FIG. 1 and/or may be viewed as a concatenation of subframes as exemplarily illustrated in FIG. 2 or FIG. 3. According to an exemplary embodiment of the invention, the shared data channel may be defined as in the Technical Background section herein or as in 3GPP TR 25.814, available at http://www.3gpp.org and incorporated herein by reference.

In the embodiments of the invention described herein, the information on the channel state may be used to communicate a "snapshot" of the channel quality at a given time instance or over a time interval. If information on the channel state should be used for scheduling or link adaptation, a short report interval may be advantageous. However, even if the report interval of the channel state information is not minimal, the receiver could utilize the information on the channel state in the past for the prediction of a future channel state, which may allow for an adequate scheduling and/or link adaptation.

In some embodiments of the invention, the receiver (e.g., Node B in FIG. 28) of the information on the channel state may also comprise a scheduling for scheduling the mobile stations and/or a link adaptation entity for performing link adaptation on the communication channel. The mobile terminals served by a base station (i.e., the receiver in this example) may receive information on the channel state from the mobile stations to facilitate scheduling and/or link adaptation.

It should be noted that, particularly in a mobile communication system, the transmitted channel quality information may need to be protected against errors. To this end, one or more of well-known techniques like error detection coding (e.g., CRC checksum), forward error correction (Convolutional code, turbo code, Reed-Solomon code), automatic repeat requests (ARQ), etc. may be employed prior to transmission of the encoded channel quality information. Obviously same techniques should be processed appropriately in the receiver after reception prior to decoding of channel quality information.

Moreover, it should be noted that in another embodiment of the invention any parameter used to control one or more aspects of the partitioning, transformation or encoding may be determined by a network management entity, e.g., a NodeB. In this case, the respective control parameters may be signalled from the network to the channel quality information transmitter (e.g., a mobile station) using control signalling, e.g., Layer 1/Layer 2 (L1/L2) control signals on a L1/L2 control channel, control information in a MAC header, or using RRC signalling. The frequency of such L1/L2 control signalling for CQI parameters may be periodic or event-driven. The frequency of the control signalling may be determined by a management entity. It may be additionally advantageous to convey different control parameters using control signalling in different resources, e.g., using resources that differ in at least one of:

Time unit (e.g., different timeslot, resource block, radio frame, subframe, transmission time interval, millisecond, etc.)

Frequency unit (e.g., different carrier frequency, subband, resource block, etc.)

Antenna unit (e.g., different transmit antenna, receive antenna, antenna array unit, MIMO channel, etc.)

Code unit (e.g., different spreading code number or ID)

Polarization direction (e.g., horizontal, vertical, circular, etc.)

Any event mentioned previously or hereafter that may cause the transmitter to decide to change one or more channel quality information parameters (e.g., number of partitions, number of values/coefficients per partition, transformation parameters, number of transmitted values/coefficients per partition, number of available/required bits for channel quality information, etc.) may as well or instead cause the management entity to decide a change of parameter(s) mutatis mutandis. In case there is a change to the parameters, same may be conveyed to the channel quality information transmitter using e.g., a control signal, as outlined in the previous paragraph.

Generally, it may be also assumed that the scheduling and link adaptation are performed on resource unit basis. For example, the smallest unit of (radio) resources (also referred to as a resource block or resource unit) that can be allocated in an OFDMA system is typically defined by one subframe in time domain and by one subcarrier/subband in the frequency domain. Similarly, in a CDMA system this smallest unit of radio resources is defined by a subframe in the time domain and a code in the code domain. Generally, a resource unit (for scheduling may) be defined as a unit formed by a combination of at least two out of a subframe in the time domain, a subcarrier/subband in the frequency domain, a code in the code domain and antenna in MIMO.

It should be noted that the channel state/quality is reported for a set of resource units into which the channel may be divided. These resource units may or may not be similar to the resource units based on which the mobile stations are scheduled and/or based on which link adaptation may be performed. For example, assuming an OFDM shared channel, the resource units for which the channel state is reported may either correspond to the resource blocks based on which scheduling and/or link adaptation is performed. Alternatively, the transmitting entity (mobile stations) providing the channel state information may also report the channel state on a resource unit-basis where the resource unit is equivalent to one or more subframes in the time domain and one or more subcarrier/subband in the frequency domain. This principle may also be extended to the code domain. In other words, it is not prerequisite that the granularity of the channel state report is identical to the granularity in which resource may be scheduled in the system and/or link adaptation is performed.

For communication in the mobile communication system e.g., an OFDM scheme, a MC-CDMA scheme or an OFDM scheme with pulse shaping (OFDM/OQAM) may be used. In some embodiments the scheduler may schedule the resources on a per-resource block basis (i.e., per subframe basis in the time domain) or on a transmission time interval (TTI) basis, wherein in the latter case it may be assumed that a TTI comprises one or more subframes in the time domain.

In one embodiment of the invention, channel quality information is reported for a channel having 10 MHz bandwidth and consisting out of 600 subcarriers with a subcarrier spacing of 15 kHz. The 600 subcarriers may then be grouped into 24 subbands (each containing 25 subcarriers), each subband occupying a bandwidth of 375 kHz. Assuming that a subframe has a duration of 0.5 ms, a resource block (RB) spans over 375 kHz and 0.5 ms.

Alternatively, a subband may consist of 12 subcarriers, 50 of those subbands constituting the available 600 subcarriers. With a transmission time interval (TTI) of 1.0 ms, equivalent to 2 subframes, a resource block (RB) spans over 300 kHz and 1.0 ms in this example.

Another embodiment of the invention relates to the implementation of the above described various embodiments using hardware and software. It is recognized that the various embodiments of the invention may be implemented or performed using computing devices (processors). A computing device or processor may, for example, be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore the concept of the invention may be also readily used in the LTE RAN currently discussed by the 3GPP.

The invention claimed is:

1. An apparatus for reporting channel quality information in a communication system, the apparatus comprising:
   one or more processors to:
      partition channel quality values, based on a channel quality information reporting parameter, into at least two partitions, each partition corresponding to a frequency bandwidth associated with the communications system, and
      encode a channel quality value of the channel quality values of at least one of the at least two partitions to obtain signaling information on channel quality, including at least one of first channel quality information and second channel quality information, based on the channel quality information reporting parameter, wherein the second channel quality information is different from the first channel quality information; and
   a transmitter to transmit the signaling information on the channel quality by reporting the first channel quality information or the second channel quality information at different reporting frequencies depending on the channel quality information reporting parameter.

2. The apparatus according to claim 1, wherein the first channel quality information corresponds to a first group of resource blocks and the second channel quality information corresponds to a second group of resource blocks.

3. The apparatus according to claim 2, wherein the first group of resource blocks is larger than the second group of resource blocks.

4. The apparatus according to claim 3, wherein the first channel quality information includes an average of channel quality values.

5. The apparatus according to claim 1, wherein the first channel quality information is sent less frequently than the second channel quality information.

6. The apparatus according to claim 1, wherein there is a channel quality value for each resource unit of a channel.

7. A method for reporting channel quality information in a communication system comprising the following steps performed by a transmitter:
   partitioning channel quality values, based on a channel quality information reporting parameter, into at least two partitions, each partition corresponding to a frequency bandwidth associated with the communications system;
   encoding a channel quality value of the channel quality values of at least one of the at least two partitions to obtain signaling information on channel quality, including at least one of first channel quality information and second channel quality information, based on the channel quality information reporting parameter, wherein the second channel quality information is different from the first channel quality information; and
   transmitting the signaling information on the channel quality by reporting the first channel quality information or the second channel quality information at different reporting frequencies depending on the channel quality information reporting parameter.

8. The method according to claim 7, wherein the first channel quality information corresponds to a first group of resource blocks and the second channel quality information corresponds to a second group of resource blocks.

9. The method according to claim 8, wherein the first group of resource blocks is larger than the second group of resource blocks.

10. The method according to claim 9, wherein the first channel quality information includes an average of channel quality values.

11. The method according to claim 7, wherein the first channel quality information is sent less frequently than the second channel quality information.

12. The method according to claim 7, wherein there is a channel quality value for each resource unit of a channel.

13. A non-transitory computer-readable medium storing instructions that, when executed by a processor of a transmitter, cause the transmitter to report channel quality information in a communication system, by:
   partitioning channel quality values, based on a channel quality information reporting parameter, into at least two partitions, each partition corresponding to a frequency bandwidth associated with the communications system;
   encoding a channel quality value of the channel quality values of at least one of the at least two partitions to obtain signaling information on channel quality, including at least one of first channel quality information and second channel quality information, based on the channel quality information reporting parameter, wherein the second channel quality information is different from the first channel quality information; and
   transmitting the signaling information on the channel quality by reporting the first channel quality information or the second channel quality information at different reporting frequencies depending on the channel quality information reporting parameter.

14. An apparatus for receiving channel quality information in a communication system, the apparatus comprising:
   a receiver to receive signaling information on channel quality including first channel quality information and second channel quality information reported at different reporting frequencies depending on a channel quality information reporting parameter, and
   one or more processors to decode the signaling information on the channel quality based on the channel quality information reporting parameter to obtain a channel quality value of channel quality values of at least one of at least two partitions, wherein the channel quality values are partitioned based on the channel quality information reporting parameter into the at least two partitions, each partition corresponding to a frequency bandwidth associated with the communications system.

15. The apparatus according to claim 14, wherein the receiver is configured to receive channel quality values from a plurality of transmitters, and wherein the receiving circuitry includes a scheduler to schedule a respective one of the plurality of transmitters taking into account at least the channel quality value signaled by the respective transmitter.

16. The apparatus according to claim 14, wherein the receiver is configured to receive channel quality values from a plurality of transmitters, and wherein the one or more processors are configured to select at least one link adaptation parameter for link adaptation for a respective one of the plurality of transmitters taking into account at least the channel quality value signaled by the respective transmitter.

17. The apparatus according to claim 16, wherein the at least one link adaptation parameter is related to at least one of a modulation and coding scheme, a configuration of a hybrid automatic repeat request process, and transmission power control.

* * * * *

UNITED STATES PATENT AND TRADEMARK OFFICE
CERTIFICATE OF CORRECTION

PATENT NO. : 10,306,505 B2
APPLICATION NO. : 15/877609
DATED : May 28, 2019
INVENTOR(S) : Golitschek Edler van Elbwart Page 1 of 1

It is certified that error appears in the above-identified patent and that said Letters Patent is hereby corrected as shown below:

In the Specification

Column 18, Line 12, change "ld" to --Id--

Column 19, Line 65, change "$c_3^2, c_3^2$" to --$c_3^2, c_{10}^2$--

Column 24, Line 25, change "ld" to --Id--

Column 25, Line 20, change "ld" to --Id--

Column 25, Line 27, change "ld" to --Id--

Signed and Sealed this
Sixteenth Day of July, 2019

Andrei Iancu
*Director of the United States Patent and Trademark Office*